(12) United States Patent
Chao et al.

(10) Patent No.: US 12,326,557 B2
(45) Date of Patent: Jun. 10, 2025

(54) HEAD-MOUNTED EYE TRACKING SYSTEM

(71) Applicant: Industrial Technology Research Institute, Hsinchu (TW)

(72) Inventors: Chia-Hsin Chao, Hsinchu County (TW); Han-Kuei Fu, New Taipei (TW); Meng-Han Lin, Taoyuan (TW); Ming-Hsien Wu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 18/482,010

(22) Filed: Oct. 5, 2023

(65) Prior Publication Data

US 2024/0027755 A1  Jan. 25, 2024

Related U.S. Application Data

(63) Continuation-in-part of application No. 17/229,846, filed on Apr. 13, 2021, now Pat. No. 11,803,052.

(30) Foreign Application Priority Data

Dec. 28, 2020 (TW) ................................. 109146422

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/013* (2013.01); *G02B 2027/0178* (2013.01)

(58) Field of Classification Search
CPC ............ G02B 27/0093; G02B 27/0172; G02B 2027/013; G02B 2027/0178; G02B 2027/0187
See application file for complete search history.

(56) References Cited

U.S. PATENT DOCUMENTS

| 10,698,483 B1 * | 6/2020 | Ouderkirk .......... G02B 27/0176 |
| 2020/0271936 A1 | 8/2020 | Leibovici et al. |
| 2022/0107517 A1 * | 4/2022 | Yaroshchuk ............. G02B 3/14 |

FOREIGN PATENT DOCUMENTS

| CN | 108572447 | 9/2018 |
| CN | 108604116 | 9/2018 |
| CN | 111781722 | 10/2020 |
| CN | 112014975 | 12/2020 |
| WO | 2018215272 | 11/2018 |

OTHER PUBLICATIONS

"Office Action of China Counterpart Application", issued on Nov. 20, 2023, p. 1-p. 7.

\* cited by examiner

*Primary Examiner* — Amit Chatly

(74) *Attorney, Agent, or Firm* — JCIPRNET

(57) ABSTRACT

A head-mounted eye tracking system including an eye tracker, a signal processor, and a plurality of light-emitting optical guides is provided. The eye tracker is adaptable for sensing eyeballs of a wearer. The eye tracker includes a plurality of light-emitting devices and a plurality of sensing devices. The plurality of light-emitting devices are adaptable for emitting a tracking beam. The sensing devices are adaptable for receiving the tracking beam reflected by the eyeballs of the wearer. The signal processor is signally connected to the eye tracker. The plurality of light-emitting optical guides is disposed corresponding to the plurality of light-emitting devices.

19 Claims, 36 Drawing Sheets

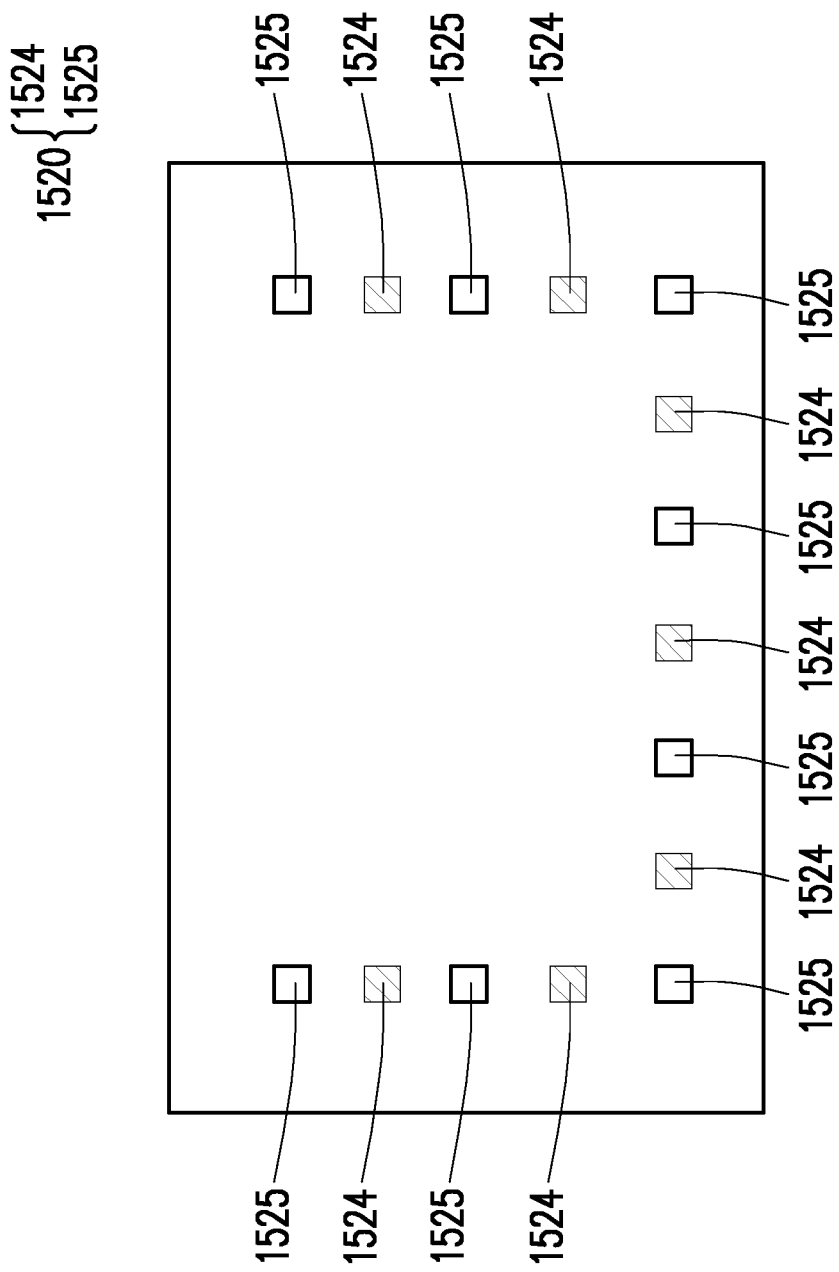

91(90)

HEAD-MOUNTED EYE TRACKING SYSTEM

CROSS-REFERENCE TO RELATED APPLICATION

This application is a continuation-in-part application of and claims the priority benefit of U.S. application Ser. No. 17/229,846, filed on Apr. 13, 2021, which claims the priority benefit of Taiwan application serial no. 109146422, filed on Dec. 28, 2020. The entirety of each of the aforementioned patent applications is hereby incorporated by reference herein and made a part of this specification.

TECHNICAL FIELD

The disclosure relates to a head-mounted eye tracking system.

BACKGROUND

In order to provide audio and video effects with higher quality, more focus has been laid on virtual reality (VR), augmented reality (AR), mixed reality (MR), and the like for the development of new generation of display technologies. The head-mounted eye tracking system is one of the approaches adopted to realize these technologies.

Generally speaking, a head-mounted eye tracking system tracks the movement of eyeballs by using an eye tracker installed therein, and adjusts the displayed image according to the direction of vision so as to improve the reality effect. Take the current eye tracker as an example, it uses a camera for capturing moving images to track and determine the position of eyeballs. However, such tracking method is often restricted to the frame rate of the camera. In addition, due to the high complexity, large volume and/or heavy weight of the camera, the wearer might feel uncomfortable when in use. The current eye tracker, which uses a plurality of luminous components to direct illumination towards the eyeballs and their immediate vicinity, tracks and determines the position of eyeballs inaccurately because the illumination distributed on the eyeballs and their immediate vicinity is dispersed. On the other hand, the current eye tracker uses a plurality of photosensitive components to generate photoelectric signals related to the directed illumination. When the gain of the photoelectric signals is insufficient, the current eye tracker also inaccurately tracks and determines the position of eyeballs.

SUMMARY

The disclosure provides a head-mounted eye tracking system, which is adaptable for sensing the eyeball movement of a wearer.

In the disclosure, a head-mounted eye tracking system includes an eye tracker, a signal processor, and a plurality of light-emitting optical guides. The eye tracker is adaptable for sensing eyeballs of a wearer. The eye tracker includes a plurality of light-emitting devices and a plurality of sensing devices. The plurality of light-emitting devices are adaptable for emitting a tracking beam. The sensing devices are adaptable for receiving the tracking beam reflected by the eyeballs of the wearer. The signal processor is signally connected to the eye tracker. The plurality of light-emitting optical guides is disposed at a position corresponding to the plurality of light-emitting devices.

In the disclosure, a head-mounted eye tracking system includes a light-transmitting substrate, at least two eye trackers, a signal processor, and a plurality of light-emitting optical guides. The light-transmitting substrate is made from materials that allows light to pass through. The at least two eye trackers are adaptable for sensing eyeballs of a wearer on the light-transmitting substrate. Each eye tracker includes a light-emitting device and a sensing device. The light-emitting device is adaptable for emitting a tracking beam. The sensing device is adjacent to the light-emitting device and is adaptable for receiving the tracking beam reflected from the eyeballs of the wearer. The signal processor is signally connected to both of the eye trackers. The plurality of light-emitting optical guides is at a position matching the plurality of light-emitting devices.

The plurality of light-emitting optical guides may also guide and direct the ray emitted from a light-emitting device to a specific area around pupils of the eyeballs. In this way, an illuminated area may be concentrated, and the optical signal quality or the corresponding electronic signal quality received by the sensing device of the eye tracker could be improved.

Several exemplary embodiments accompanied with figures are described in detail below to further describe the disclosure in details.

BRIEF DESCRIPTION OF THE DRAWINGS

FIGS. 16A-16C are schematic partial views of a head-mounted eye tracking system according to the sixteenth embodiment of the disclosure.

DETAILED DESCRIPTION OF DISCLOSED EMBODIMENTS

Figure 1A:
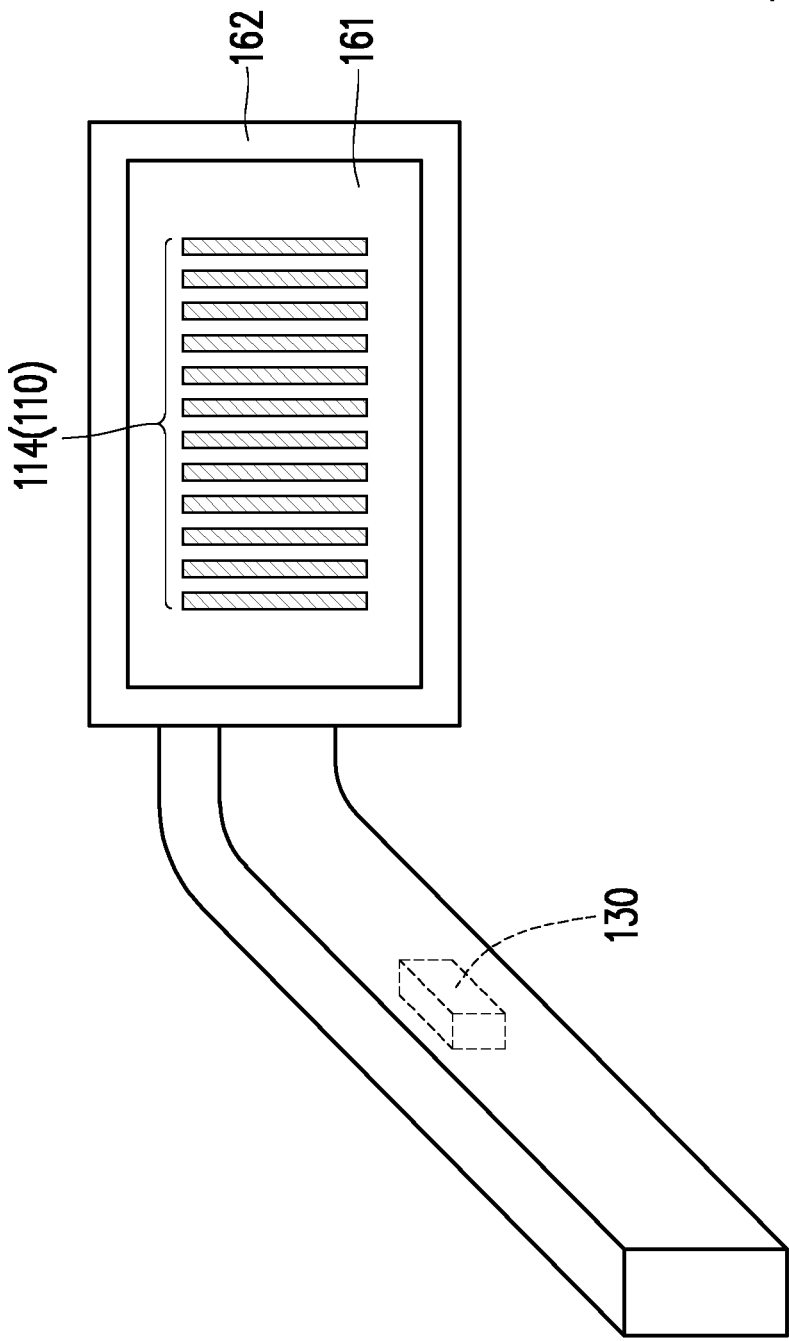
FIG. 1A is a partial perspective view of a head-mounted eye tracking system according to the first embodiment of the disclosure.

In the drawings, for the purpose of clarity, the size of some elements or film layers may be enlarged or reduced. In addition, for clarity, some elements or film layers may be omitted or partially marked in the drawings. In addition, the numerical value indicated in the specification may include the numerical value and the deviation value within the deviation range acceptable to a person having ordinary knowledge in the art.

In the following embodiments or corresponding drawings, the same or similar components are represented by the same or similar reference numerals, and have the same or similar functions, and related description is omitted. In addition, for clarity, perhaps not all the light-emitting devices, sensing devices and/or other similar devices are labeled or drawn one by one in the drawings.

Figure 1B:
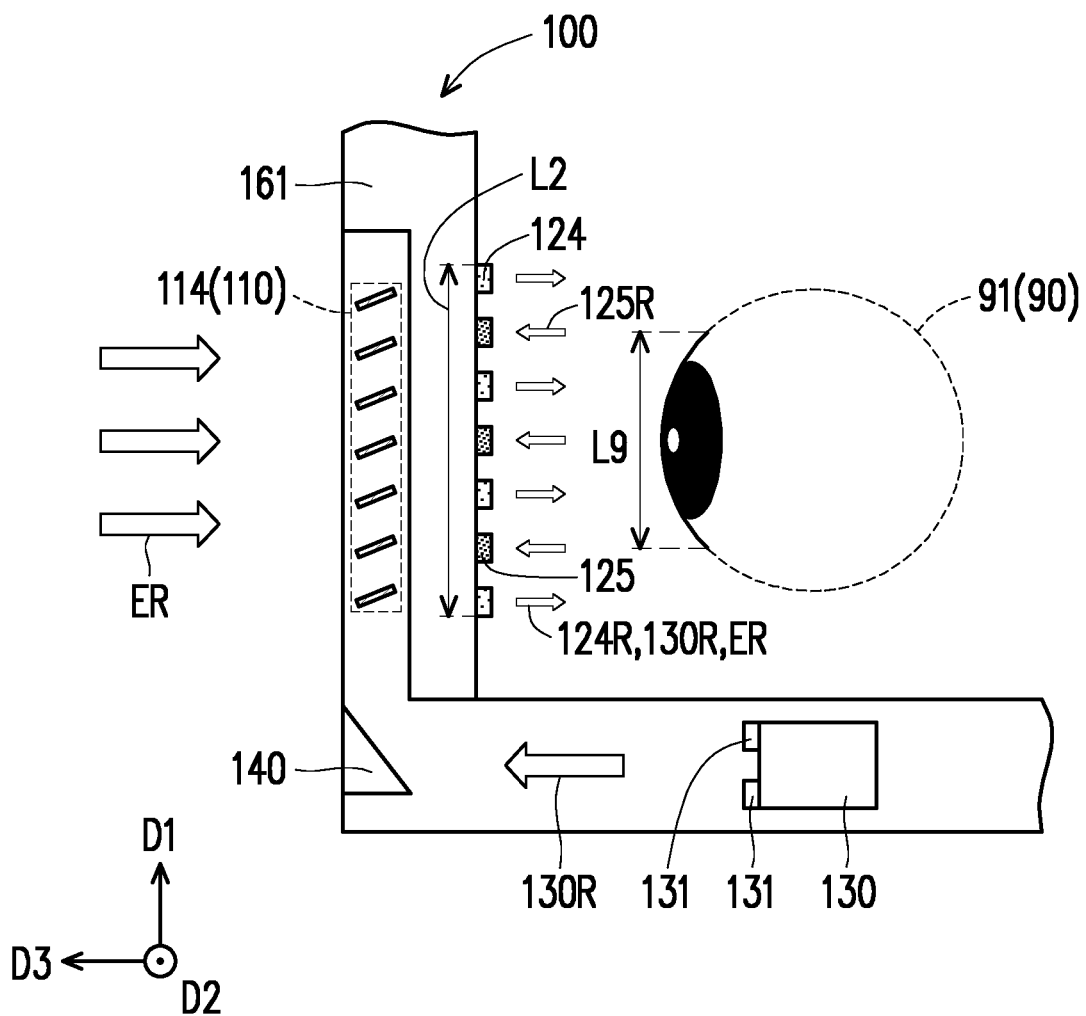
FIG. 1B is a schematic partial top view of a head-mounted eye tracking system according to the first embodiment of the disclosure.
Figure 1C:
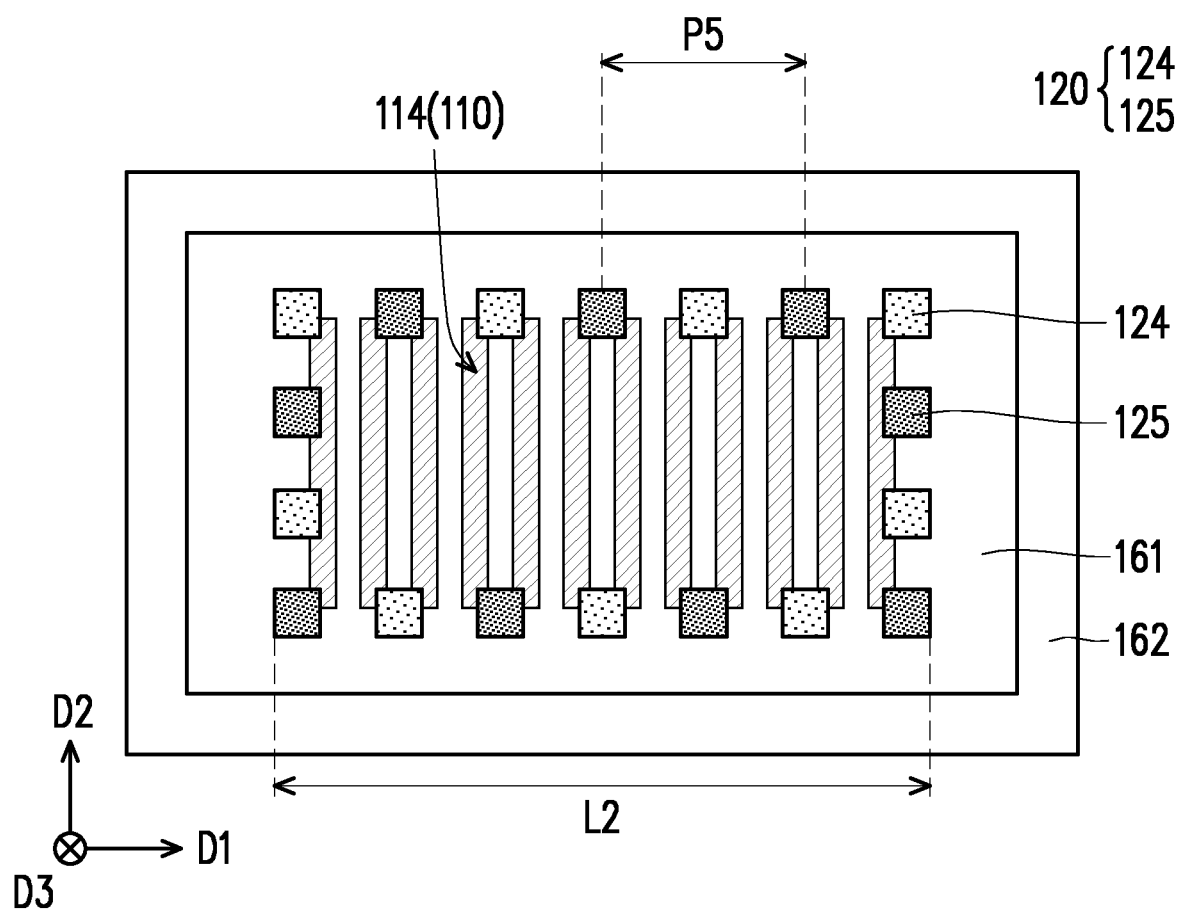
FIG. 1C is a schematic partial front view of a head-mounted eye tracking system according to the first embodiment of the disclosure.

FIG. 1A is a partial perspective view of a head-mounted eye tracking system according to the first embodiment of the disclosure. FIG. 1B is a schematic partial top view of a head-mounted eye tracking system according to the first embodiment of the disclosure. FIG. 1C is a schematic partial front view of a head-mounted eye tracking system according to the first embodiment of the disclosure. In addition, for clarity, not all the light-emitting devices 124, the sensing devices 125, and/or the display devices 131 are marked or shown one by one in FIG. 1A to FIG. 1C.

Referring to FIG. 1A to FIG. 1C, the head-mounted eye tracking system 100 includes an optical combiner 110 and an eye tracker 120. The optical combiner 110 includes an optical coupler 114. The number and configuration of the optical coupler 114 may be adjusted and designed according to actual requirements, which are not limited in the disclosure. The eye tracker 120 is disposed on the optical combiner 110. The eye tracker 120 is adaptable for sensing the movement of the eyeball 91 of the wearer 90. In the embodiment, the wearer 90 includes but not limited to a human being.

In the embodiment, the optical coupler 114 may include a coupler mirror, but the disclosure is not limited thereto. In an embodiment, the optical coupler similar to the optical coupler 114 may include an optical grating coupler. In an embodiment, the optical coupler similar to the optical coupler 114 may include a volume holographic grating (VHG), a surface relief grating, or a liquid crystal film coupler.

In the embodiment, the head-mounted eye tracking system 100 may further include a light-transmitting substrate 161. The optical combiner 110 may be disposed on one side of the light-transmitting substrate 161. In an embodiment, the light-transmitting substrate 161 may include glass, polymer (for example, polyimide (PI), polyethylene terephthalate (PET), but not limited thereto), or other suitable light-transmitting materials. In an embodiment, the light-transmitting substrate 161 may be embedded in the frame 162, but the disclosure is not limited thereto. In an embodiment, the light-transmitting substrate 161 may be configured at a specific location relative to a pupil of the eyeball 91 of the wearer 90.

In the embodiment, the head-mounted eye tracking system 100 may further include a display 130. The display 130 is adapted to emit a display beam 130R. The display beam 130R may be irradiated to the eyeball 91 of the wearer 90 through the optical coupler 114 of the optical combiner 110.

In an embodiment, the optical combiner 110 may be integrated into the light-transmitting substrate 161 to combine visual information (e.g., including a visual information presented by display beam 130R) in a specific direction.

In an embodiment, the display 130 may include one or more display devices 131. The display device 131 of the display 130 is, for example, a light emitting diode (LED), a micro LED, an organic LED, or a laser diode that can emit a corresponding display beam 130R. Those skilled in the art can select from the above according to actual needs. The display beam 130R includes, for example, red light, green light, blue light or other suitable light visible to the wearer 90. The display beam 130R emitted from the display 130 may be guided to the optical combiner 110 through a suitable light guide 140. The external beam ER and the display beam 130R may be irradiated to the eyeball 91 of the wearer 90 through the optical coupler 114 of the optical combiner 110. In other words, the eyeball 91 of the wearer 90 can receive the external beam ER and the display beam 130R through the optical coupler 114. In addition, the external beam ER may include ambient light or light emitted by other displays that are not shown.

In an embodiment, the display device 131 of the display 130 may include a light emitting diode, but the disclosure is not limited thereto. For example, the display device 131 may include a micro LED (μLED) with a dimension substantially of (5 micrometers (μm)~100 μm)×(5 μm~100 μm).

In FIG. 1B, only one kind of light guide 140 is illustrated as an example, but the disclosure is not limited thereto. In an embodiment, the light guide 140 may include a reflecting member, a refracting member, and/or other suitable light guides. For example, the light guide 140 may include a mirror, a prism, a lens, an optical fiber, and/or a light pipe.

In the embodiment, the eye tracker 120 may include a plurality of light-emitting devices 124 and a plurality of sensing devices 125.

In an embodiment, the plurality of light-emitting devices 124 and/or the plurality of sensing devices 125 may be disposed on the light-transmitting substrate 161 and located on the other side, for example, the opposite side relative to the optical combiner 110, but the disclosure is not limited thereto.

The light-emitting device 124 of the eye tracker 120 is adapted to directly or indirectly emit a tracking beam 124R directed to the eyeball 91 of the wearer 90. The tracking beam 124R includes, for example, infrared light or other suitable light that is invisible to the wearer 90 and/or less harmful to the tissue of the eyeball 91. The luminous quantity of the tracking beam 124R may be adjusted according to design requirements and must comply with biological safety regulations, which is not limited in the disclosure.

The sensing device 125 of the eye tracker 120 includes, for example, a reverse-biased LED, a photodiode (PD) or a light sensing device under a plane of optical layer with a diffraction pattern (such as mura mask, but not limited thereto). After the tracking beam 124R irradiates the eyeball 91 of the wearer 90, a corresponding reflection may be generated in the corresponding region or direction according to the corresponding eyeball tissue (e.g., the iris, pupil, lens, cornea, etc.). For example, under the irradiation of the tracking beam 124R of substantially the same light wavelength, the eyeball tissue may have light reflections of different directions and/or intensities at different positions. In this way, the movement of the eyeball 91 may be tracked by using the sensing device 125 which receives the tracking beam (or referred to as reflection beam 125R) reflected by the eyeball 91 of the wearer 90. That is, compared to a tracker that is used for a focusing optical element for imaging, the eye tracker 120 can track the movement of the eyeball 91 without imaging.

In an embodiment, the sensing device 125 can track the movement of the eyeball 91 by high-frequency sampling. For example, the sampling frequency of the sensing device 125 may be higher than the frame rate of general dynamic images. In an embodiment, the sampling frequency of the sensing device 125 may be greater than or equal to 250 Hertz (Hz), which may be determined by the circuit design of the sensor, but the disclosure is not limited thereto.

In the embodiment, among the plurality of sensing devices 125, the distance P5 between two adjacent sensing devices 125 is between 1 millimeter (mm) and 30 mm. In an embodiment, among the plurality of sensing devices 125, the distance P5 between two adjacent sensing devices 125 may be between 3 mm and 15 mm.

In the embodiment, the light-emitting device 124 may be a micro LED (μ LED) with a dimension substantially of (5 μm~100 μm)×(5 μm~100 μm). In this way, part or all of the light-emitting devices 124 may be at least partially overlapped (that is, including partially overlapped or completely overlapped) with the optical coupler 114. In other words, part or all of the light-emitting devices 124 may at least partially overlap the visible region of the eyeball 91 of the wearer 90.

In the embodiment, the sensing device 125 may be a reverse-biased μLED or a photodiode (PD) with a dimension substantially of (5 μm~100 μm)×(5 μm~100 μm). In this way, part or all of the sensing devices 125 may be partially or completely overlapped with the optical coupler 114. In other words, part or all of the sensing devices 125 may at least partially overlap the visible region of the eyeball 91 of the wearer 90.

In an embodiment, the micro LED can emit light or perform light detection through different operating biases at different timings.

In the embodiment, a plurality of light-emitting devices 124 or a plurality of sensing devices 125 surround the optical coupler 114, but the disclosure is not limited thereto.

In the embodiment, in the first arrangement direction D1, part of the plurality of light-emitting devices 124 and part of the plurality of sensing devices 125 are arranged alternately with each other, but the disclosure is not limited thereto.

In the embodiment, in the third arrangement direction D3 perpendicular to the first arrangement direction D1, part of the plurality of light-emitting devices 124 and part of the plurality of sensing devices 125 are arranged to at least partially overlap the optical coupler 114.

Figure 1D:
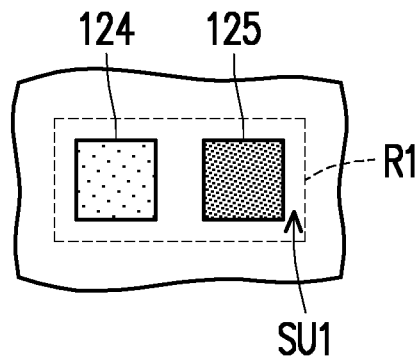
FIG. 1D is a schematic view of an arrangement of a light-emitting device and a sensing device of a head-mounted eye tracking system according to an embodiment of the disclosure.

Taking FIG. 1D as an example, in an embodiment, in a closed range R1 in the front view state, the light-emitting device 124 and the sensing device 125 adjacent to each other may be integrated into a sensing unit SU1. In the sensing unit SU1, the light-emitting device 124 and the sensing device 125 may be arranged alternately.

Figure 1E:
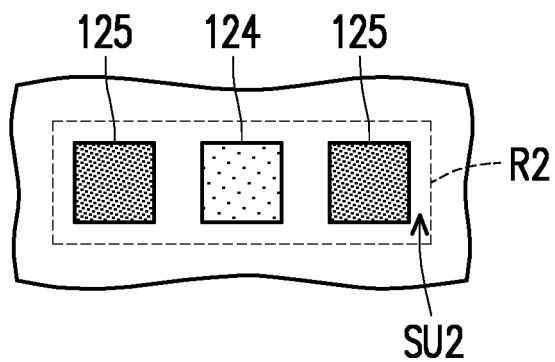
FIG. 1E is a schematic view of an arrangement of a light-emitting device and a sensing device of another head-mounted eye tracking system according to an embodiment of the disclosure.

Taking FIG. 1E as an example, in an embodiment, in a closed range R2 in the front view state, the light-emitting device 124 and the plurality of sensing devices 125 may be integrated into a sensing unit SU2. In the sensing unit SU2, the light-emitting device 124 and the sensing device 125 may be arranged alternately as shown in FIG. 1E.

Figure 1F:
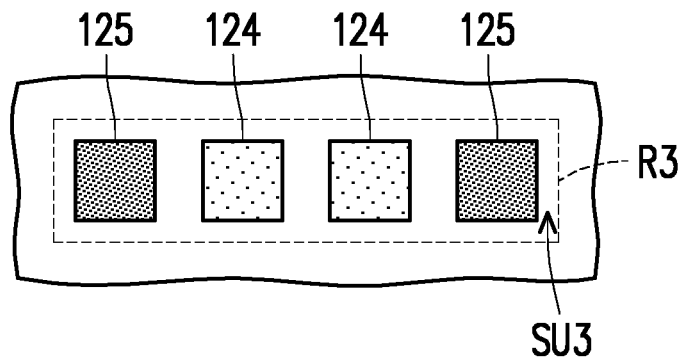
FIG. 1F is a schematic view of an arrangement of a light-emitting device and a sensing device of still another head-mounted eye tracking system according to an embodiment of the disclosure.

Taking FIG. 1F as an example, in an embodiment, in a closed range R3 in the front view state, a plurality of light-emitting devices 124 and a plurality of sensing devices 125 may be integrated into a sensing unit SU3. In the sensing unit SU3, one of the light-emitting devices 124 and one of the sensing devices 125 may be arranged alternately as shown in FIG. 1E.

In an embodiment, in a sensing unit, the number of sensing devices 125 may be greater than or equal to the number of light-emitting devices 124.

In the embodiment, in the second arrangement direction D2 perpendicular to the first arrangement direction D1, part of the plurality of light-emitting devices 124 and part of the plurality of sensing devices 125 are arranged alternately with each other, but the disclosure is not limited thereto.

In the embodiment, the first arrangement direction D1, the second arrangement direction D2, and the third arrangement direction D3 are substantially perpendicular to each other.

The manner in which the wearer 90 wears the head-mounted eye tracking system 100 may be adaptively or reasonably adjusted according to habit, preference, or use thereof. In a suitable or reasonable embodiment, the third arrangement direction D3 may be parallel, substantially parallel, or close to parallel to the visual direction of the eyeball 91 of the wearer 90.

In the embodiment, the number of light-emitting devices 124 and the number of sensing devices 125 may be arranged according to actual requirements. The light-emitting devices 124 and the sensing devices 125 may be arranged alternately in a regular manner or irregular manner as shown in FIG. 1C to FIG. 5, but the disclosure is not limited thereto. In the embodiment, the number of sensing devices 125 may be greater than or equal to the number of light-emitting devices 124.

Figure 2:
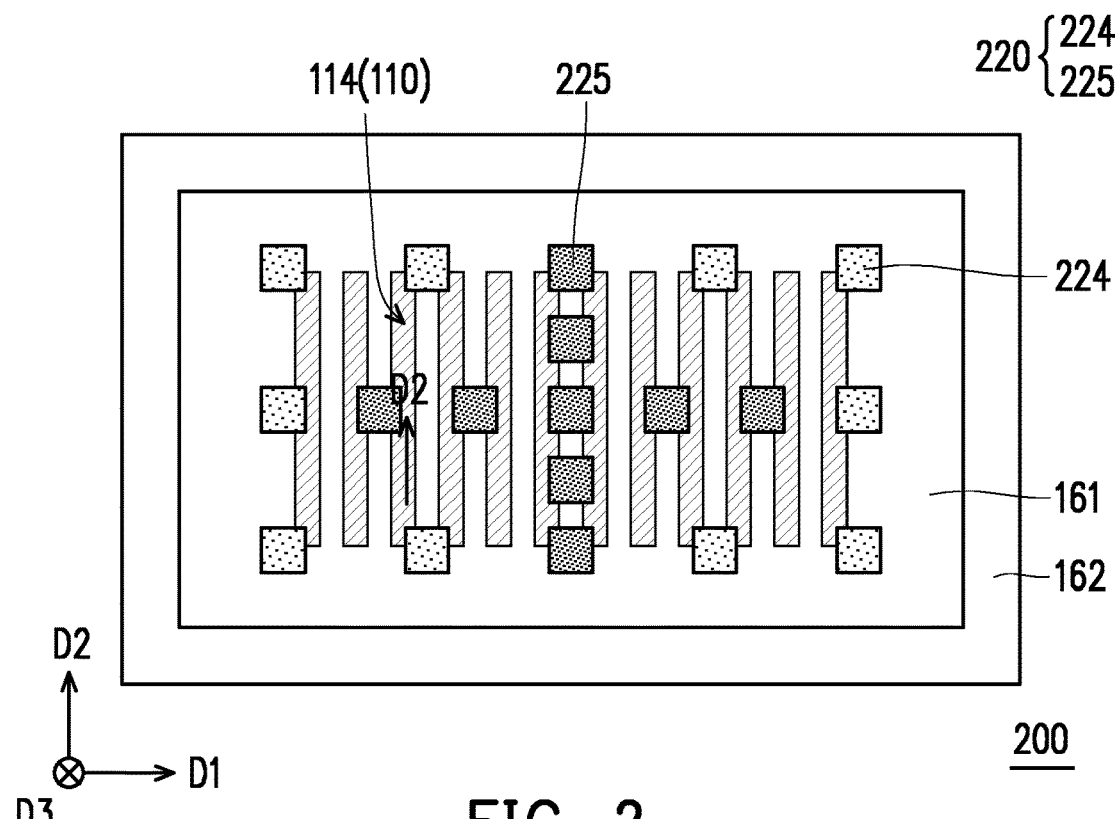
FIG. 2 is a schematic partial front view of a head-mounted eye tracking system according to the second embodiment of the disclosure.

FIG. 2 is a schematic partial front view of a head-mounted eye tracking system according to the second embodiment of the disclosure.

In the embodiment, the head-mounted eye tracking system 200 includes an optical combiner 110 and an eye tracker 220. The eye tracker 220 may include a plurality of light-emitting devices 224 and a plurality of sensing devices 225. The light-emitting devices 224 may be the same or similar to the light-emitting devices 124 in the previous embodiment. The sensing devices 225 may be the same or similar to the sensing devices 125 in the previous embodiment.

In the embodiment, a plurality of light-emitting devices 224 may surround the optical coupler 114, and a plurality of sensing devices 225 may be arranged in a cross shape.

Figure 3:
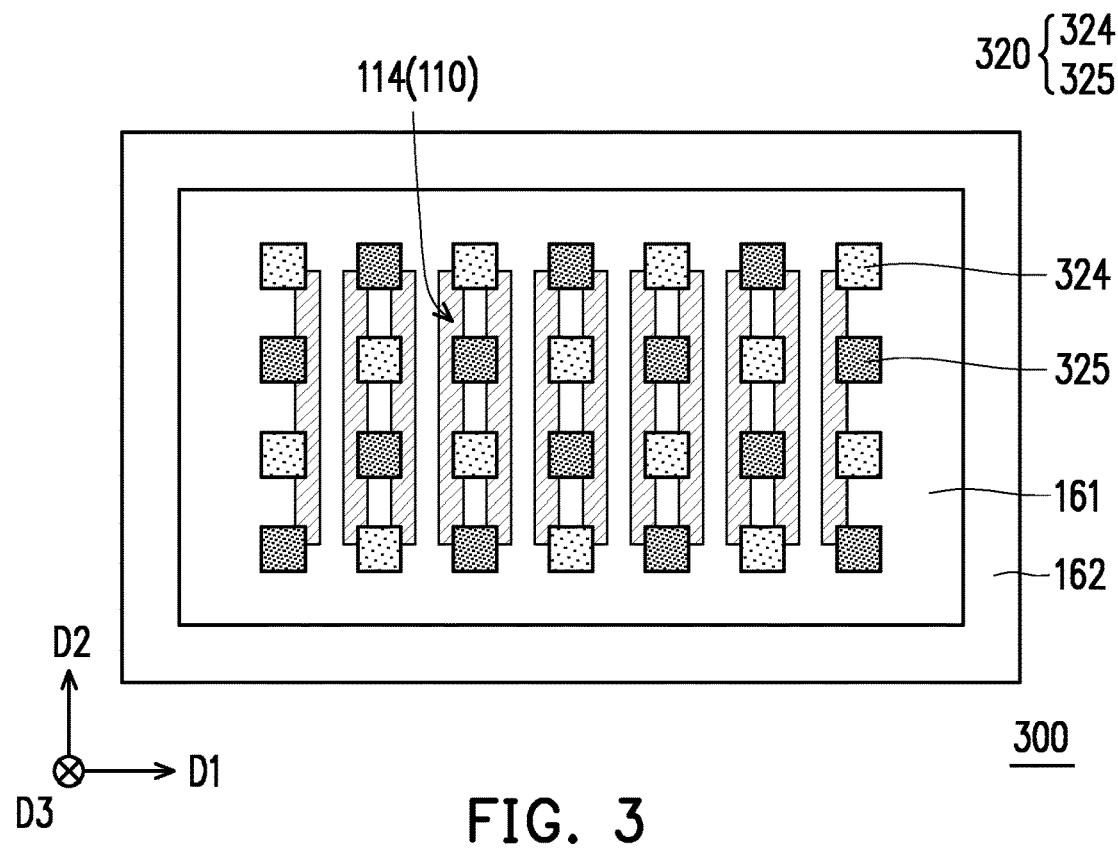
FIG. 3 is a schematic partial front view of a head-mounted eye tracking system according to the third embodiment of the disclosure.

FIG. 3 is a schematic partial front view of a head-mounted eye tracking system according to the third embodiment of the disclosure.

In the embodiment, the head-mounted eye tracking system 300 includes an optical combiner 110 and an eye tracker 320. The eye tracker 320 may include a plurality of light-emitting devices 324 and a plurality of sensing devices 325. The light-emitting devices 324 may be the same or similar to the light-emitting devices 124 in the previous embodiment. The sensing devices 325 may be the same or similar to the sensing devices 125 in the previous embodiment.

In the embodiment, part of the plurality of light-emitting devices 324 and part of the plurality of sensing devices 325 may be arranged alternately in the first arrangement direction D1, and part of the plurality of light-emitting devices 324 and part of the plurality of sensing devices 325 may be arranged alternately in the second arrangement direction D2, and the plurality of light-emitting devices 324 and the plurality of sensing devices 325 may be alternately arranged in an array.

Figure 4:
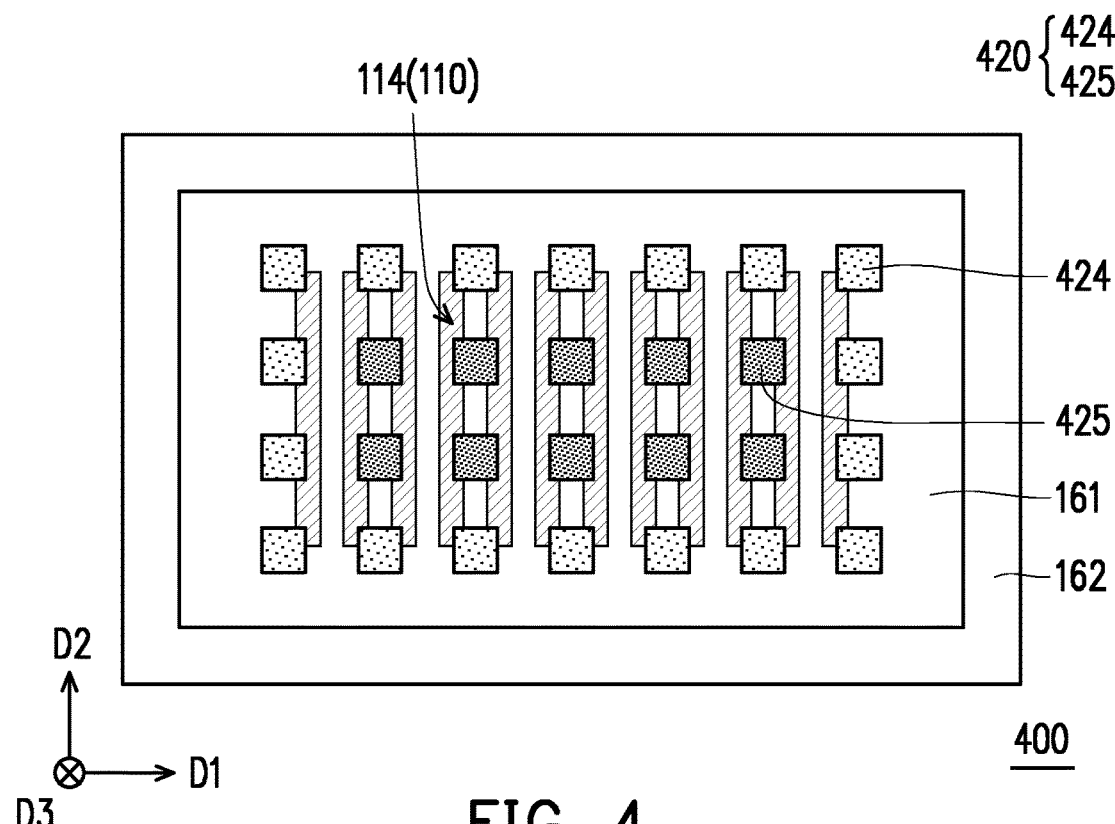
FIG. 4 is a schematic partial front view of a head-mounted eye tracking system according to the fourth embodiment of the disclosure.

FIG. 4 is a schematic partial front view of a head-mounted eye tracking system according to the fourth embodiment of the disclosure.

In the embodiment, the head-mounted eye tracking system 400 includes an optical combiner 110 and an eye tracker 420. The eye tracker 420 may include a plurality of light-emitting devices 424 and a plurality of sensing devices 425. The light-emitting devices 424 may be the same or similar to the light-emitting devices 124 in the previous embodiment. The sensing devices 425 may be the same or similar to the sensing devices 125 in the previous embodiment.

In the embodiment, a plurality of light-emitting devices 424 may surround the sensing devices 425 and the optical coupler 114, and the plurality of sensing devices 425 may be arranged in an array.

Figure 5:
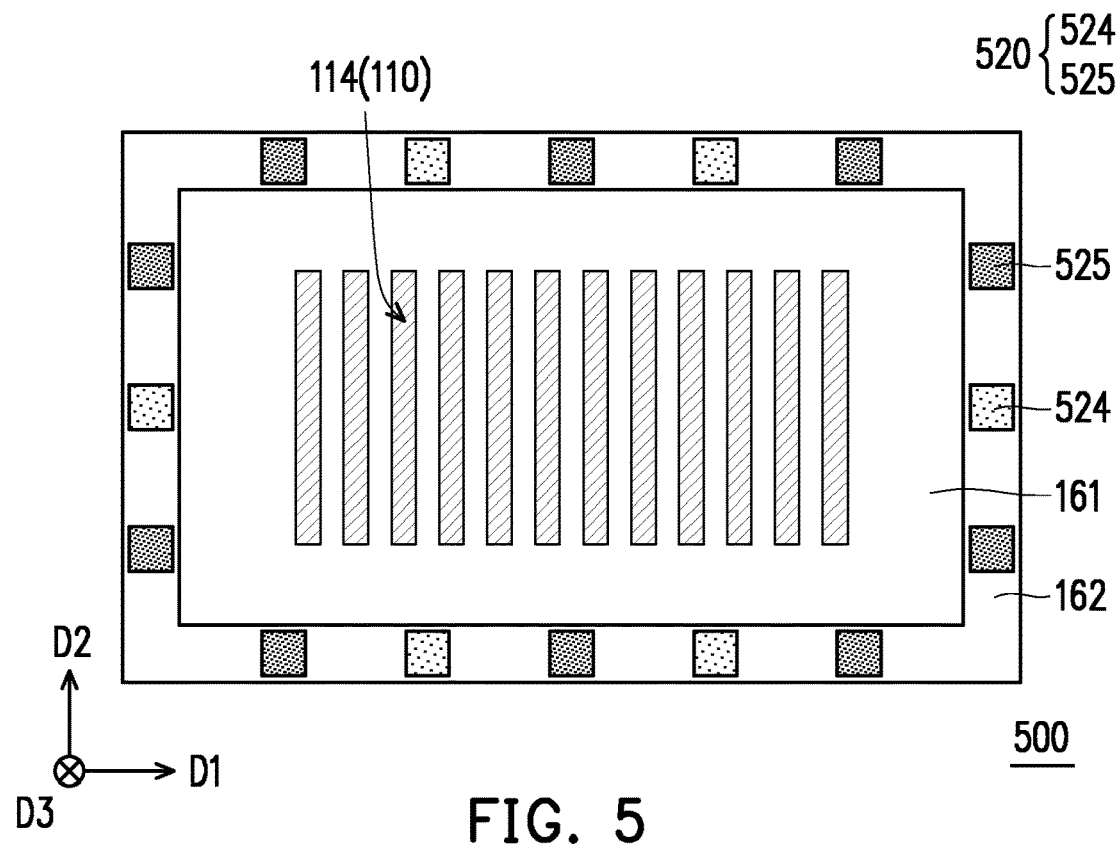
FIG. 5 is a schematic partial front view of a head-mounted eye tracking system according to the fifth embodiment of the disclosure.

FIG. 5 is a schematic partial front view of a head-mounted eye tracking system according to the fifth embodiment of the disclosure.

In the embodiment, the head-mounted eye tracking system 500 includes an optical combiner 110 and an eye tracker 520. The eye tracker 520 may include a plurality of light-emitting devices 524 and a plurality of sensing devices 525. The light-emitting devices 524 may be the same or similar to the light-emitting devices 124 in the previous embodiment. The sensing devices 525 may be the same or similar to the sensing devices 125 in the previous embodiment.

In the embodiment, a plurality of light-emitting devices 524 and/or a plurality of sensing devices 525 may be disposed on the frame 162.

In the embodiment, a plurality of light-emitting devices 524 or a plurality of sensing devices 525 may surround the optical coupler 114.

Figure 6A:
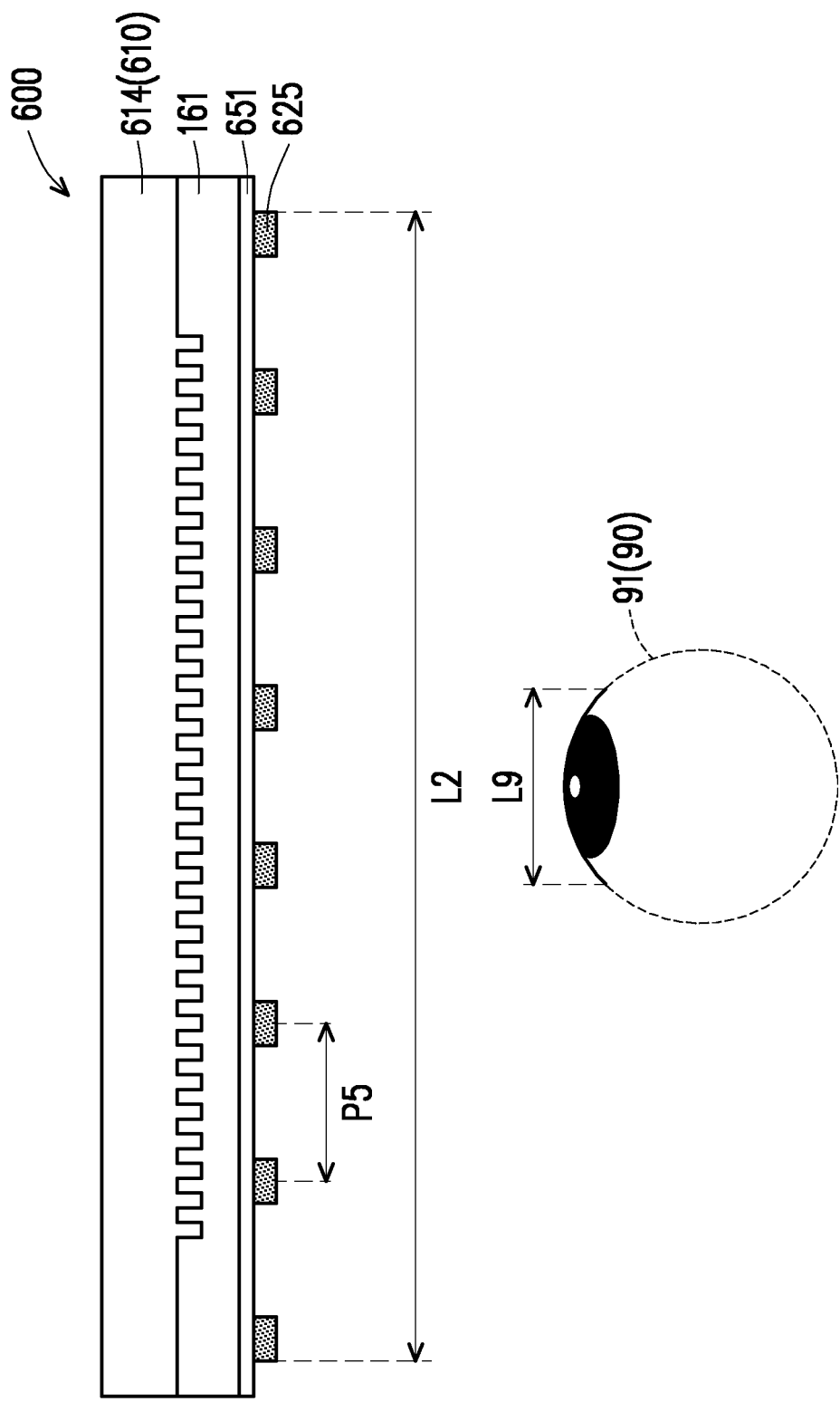
FIG. 6A is a schematic partial top view of a head-mounted eye tracking system according to the sixth embodiment of the disclosure.
Figure 6B:
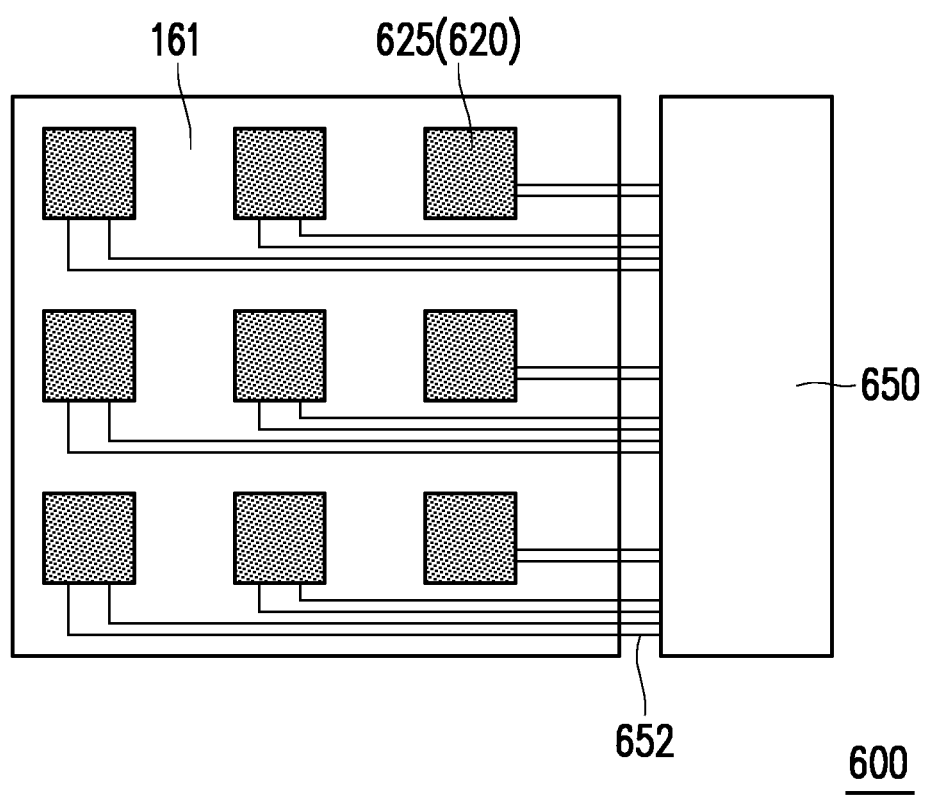
FIG. 6B is a schematic partial front view of a head-mounted eye tracking system according to the sixth embodiment of the disclosure.

FIG. 6A is a schematic partial top view of a head-mounted eye tracking system according to the sixth embodiment of the disclosure. FIG. 6B is a schematic partial front view of a head-mounted eye tracking system according to the sixth embodiment of the disclosure.

In the embodiment, the head-mounted eye tracking system 600 includes an optical combiner 610 and an eye tracker 620. The eye tracker 620 may include a plurality of light-emitting devices (which are not shown directly and may be the same or similar to the light-emitting devices 124 in the previous embodiment) and a plurality of sensing devices 625. The optical combiner 610 includes an optical coupler 614. The optical coupler 614 may include an optical grating coupler.

In the embodiment, the head-mounted eye tracking system 600 may further include a signal processor 650. The signal processor 650 may be signally connected to the eye tracker 620. For example, the optical signal or the corresponding electronic signal received by the sensing device 625 of the eye tracker 620 may be transmitted to the signal processor 650. For example, the signal processor 650 can transmit electronic signals to the light-emitting device (not shown directly, and may be the same or similar to the light-emitting device 124 in the foregoing embodiment) to drive the light-emitting device to emit light.

In the embodiment, the signal processor 650 may be signally connected to the eye tracker 620 in a wired signal transmission manner through the signal line 652 in the device layer 651, but the disclosure is not limited thereto.

In FIG. 6A and FIG. 6B, only the signal connection method between the signal processor 650 and a part of the sensing device 625 is shown exemplarily, but the disclosure is not limited thereto.

In an embodiment, the signal processor 650 may include a processing chip, but the disclosure is not limited thereto. For example, the signal processor 650 may include a computer or other processing systems (such as a cloud processing system).

In the embodiment, the device layer 651 may include a corresponding conductive film, an insulating film, and/or a semiconductor film. The conductive film, the insulating film, and/or the semiconductor film may constitute corresponding active devices, passive devices and/or circuits (such as signal lines 652).

In the embodiment, the signal line 652 at least may be formed by a part of the conductive pattern in the device layer 651, but the disclosure is not limited thereto. In other words, the signal line 652 may include a part of the conductive pattern in the device layer 651 (for example, the conductive film included in the device layer 651). The conductive pattern may be located on the light-transmitting substrate 161. In the embodiment, the conductive pattern and the sensing device 625 may be located on the same side of the light-transmitting substrate 161.

In the embodiment, the films, devices, and/or layouts in the device layer 651 may be formed or arranged in a manner commonly used in the art, and will not be further described here.

Figure 7:
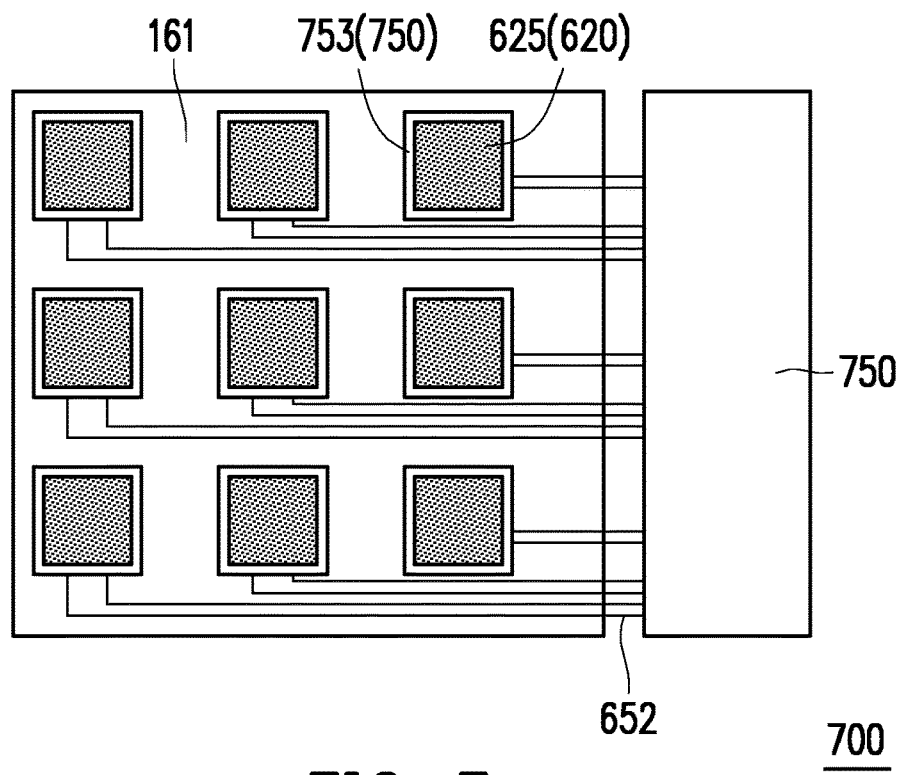
FIG. 7 is a schematic partial front view of a head-mounted eye tracking system according to the seventh embodiment of the disclosure.

FIG. 7 is a schematic partial front view of a head-mounted eye tracking system according to the seventh embodiment of the disclosure. The head-mounted eye tracking system 700 in the embodiment is similar to the head-mounted eye tracking system 600 in the sixth embodiment, and similar components used in the embodiment are denoted by the same reference numerals and have similar functions, and related description is omitted. In addition, for clarity, not all the sensing devices 625, signal lines 652, and/or processing devices 753 are labeled or shown one by one in FIG. 7.

In the embodiment, the head-mounted eye tracking system 700 includes an optical combiner (not shown directly, and may be the same as or similar to the optical combiner 110 or the optical combiner 610 in the foregoing embodiment), an eye tracker 620, and a signal processor 750.

In the embodiment, the signal processor 750 may be similar to the signal processor 650 in the previous embodiment. The signal processor 750 may further include a processing device 753. The processing device 753 may be signally connected (or electrically connected) to the corresponding sensing device 625 and/or the light-emitting device (not shown directly, and may be the same or similar to the light-emitting device 124 of the previous embodiment). The processing device 753 includes, for example, IC or μIC, but the disclosure is not limited thereto.

In the embodiment, the processing device 753 may be configured on the light-transmitting substrate 161, and the processing device 753 of the signal processor 750 may be configured between the optical combiner 610 and the sensing device 625 (shown in FIG. 6A).

In the embodiment, the processing device 753 of the signal processor 750 may at least partially overlap the sensing device 625 of the eye tracker 620, but the disclosure is not limited thereto.

Figure 8:
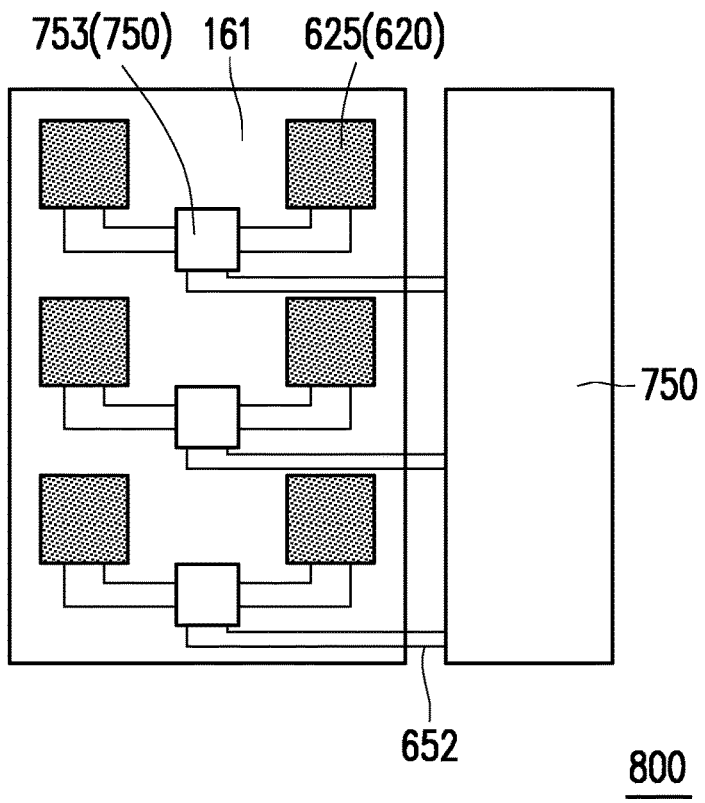
FIG. 8 is a schematic partial front view of a head-mounted eye tracking system according to the eighth embodiment of the disclosure.

FIG. 8 is a schematic partial front view of a head-mounted eye tracking system according to the eighth embodiment of the disclosure. The head-mounted eye tracking system 800 in the embodiment is similar to the head-mounted eye tracking system 700 in the seventh embodiment, and similar components in the embodiment are denoted by the same reference numerals and have similar functions, and related description is omitted. In addition, for clarity, not all the sensing devices 625, signal lines 652, and/or processing devices 753 are marked or shown one by one in FIG. 8.

In the embodiment, the processing device 753 of the signal processor 750 may not overlap the sensing device 625 of the eye tracker 620. In other words, the processing device 753 of the signal processor 750 may be far away from the sensing device 625 of the eye tracker 620.

Figure 9A:
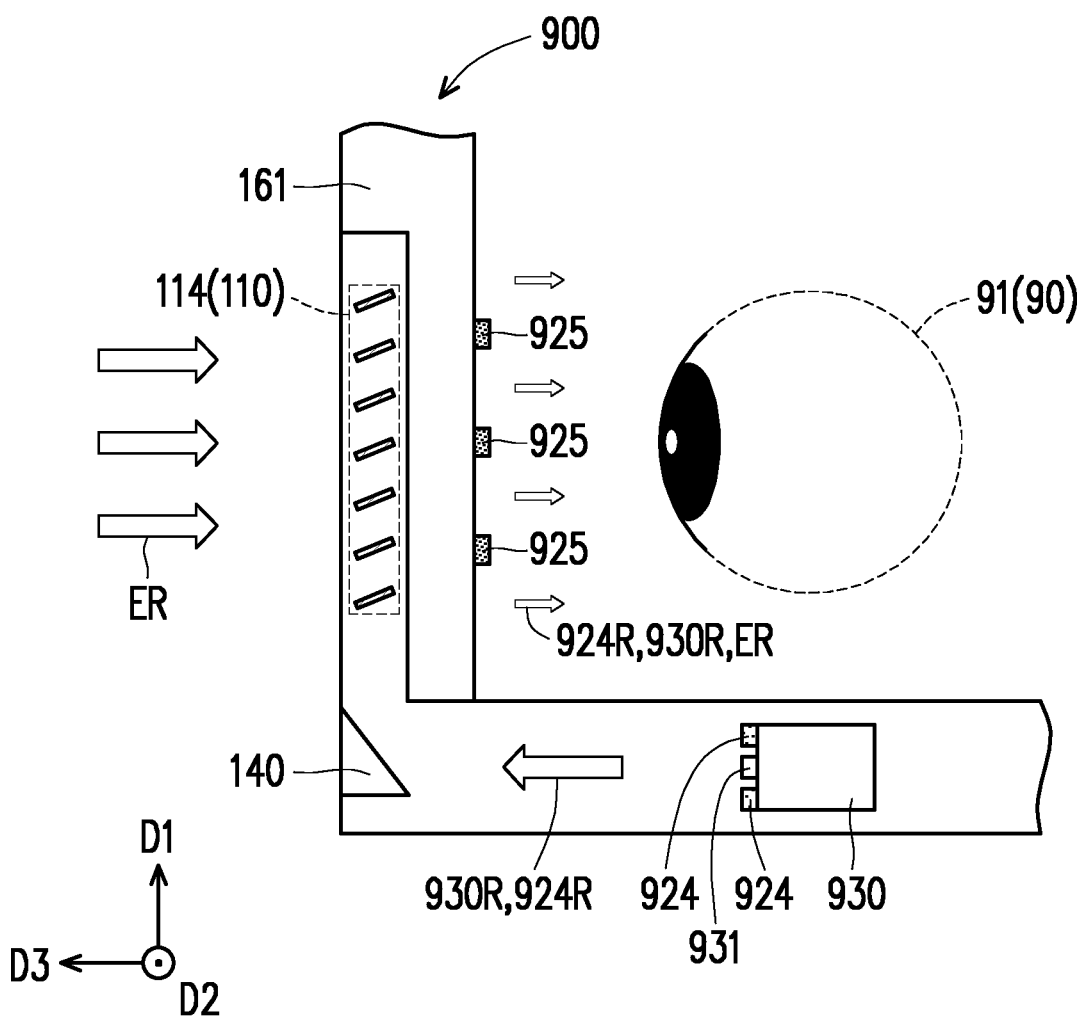
FIG. 9A is a schematic partial top view of a head-mounted eye tracking system according to the ninth embodiment of the disclosure.
Figure 9B:
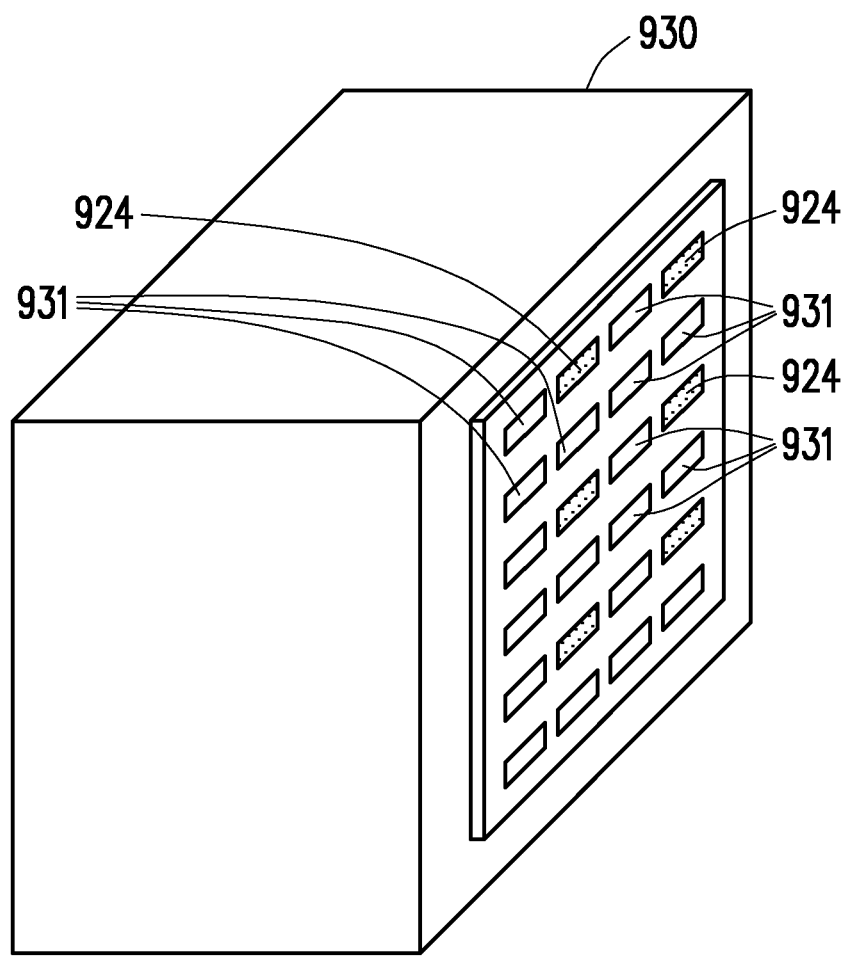
FIG. 9B is a partial perspective view of a head-mounted eye tracking system according to the ninth embodiment of the disclosure.
Figure 9C:
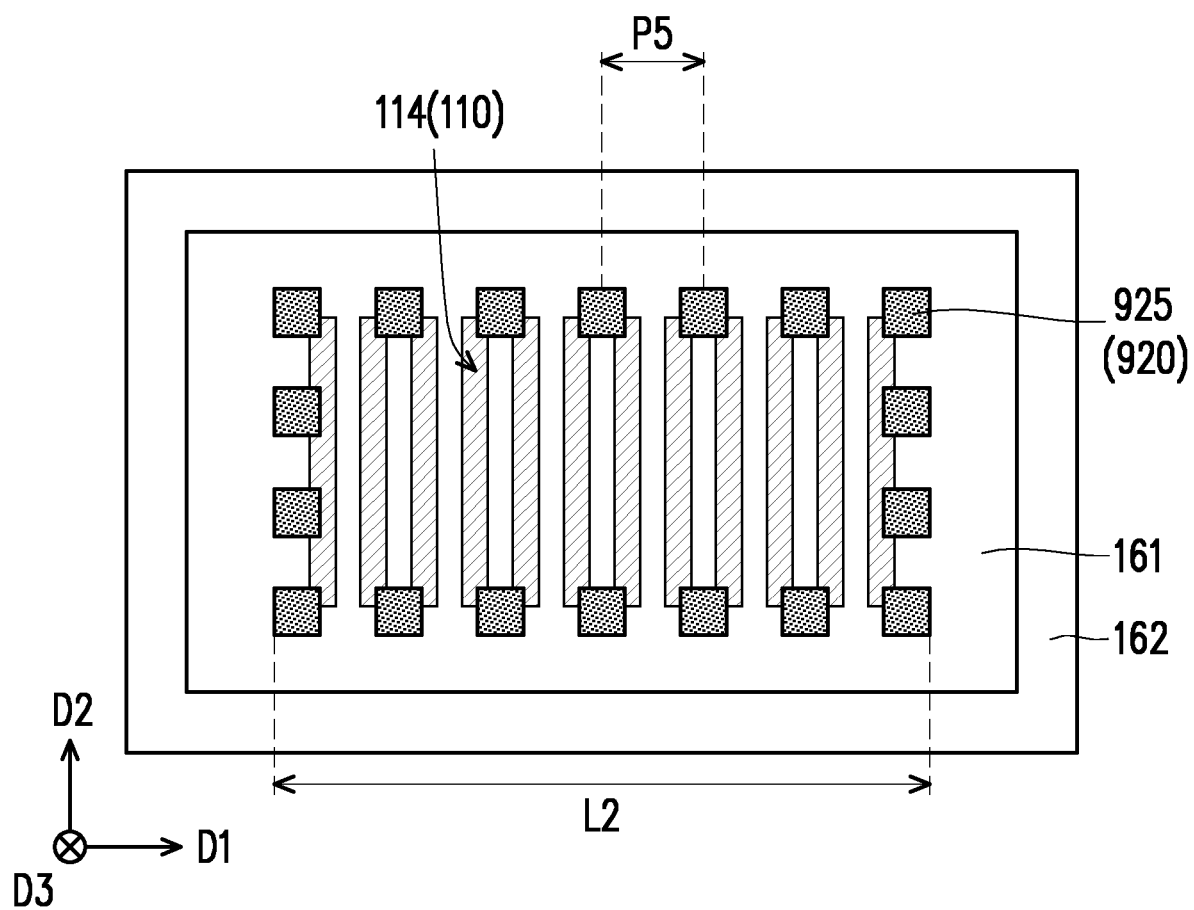
FIG. 9C is a schematic partial front view of a head-mounted eye tracking system according to the ninth embodiment of the disclosure.

FIG. 9A is a schematic partial top view of a head-mounted eye tracking system according to the ninth embodiment of the disclosure. FIG. 9B is a partial perspective view of a head-mounted eye tracking system according to the ninth embodiment of the disclosure. FIG. 9C is a schematic partial front view of a head-mounted eye tracking system according to the ninth embodiment of the disclosure. The head-mounted eye tracking system 900 in the embodiment is similar to the head-mounted eye tracking system 100 in the first embodiment, and similar components in the embodiment are denoted by the same reference numerals and have similar functions, and related description is omitted. In addition, for clarity, not all the light-emitting devices 924 and/or the sensing devices 925 are marked or shown one by one in FIG. 9A to FIG. 9C.

Referring to FIG. 9A to FIG. 9C, in the embodiment, the head-mounted eye tracking system 900 includes an optical combiner 110, an eye tracker 920, and a display 930. The eye tracker 920 may include a plurality of light-emitting devices 924 and a plurality of sensing devices 925. The light-emitting devices 924 may be the same as or similar to the light-emitting devices 124 in the previous embodiment. The sensing devices 925 may be the same or similar to the sensing devices 125 in the previous embodiment. The display 930 may be similar to the display 130 in the foregoing embodiment.

In the embodiment, the light-emitting device 924 and the sensing device 925 of the eye tracker 920 may be disposed at different positions. That is, the light-emitting device 924 and the sensing device 925 of the eye tracker 920 may be far away from each other. For example, the sensing device 925 of the eye tracker 920 may be configured on the optical combiner 110, and the light-emitting device 924 of the eye tracker 920 may be configured on the display 930. The tracking beam 924R emitted from the light-emitting device 924 of the eye tracker 920 may be guided to the optical combiner 110 through a suitable light guide 140. The external beam ER, the display beam 930R and the tracking beam 924R may be irradiated to the eyeball 91 of the wearer 90 through the optical coupler 114 of the optical combiner 110.

In the embodiment, the display device 931 of the display 930 and the light-emitting device 924 of the eye tracker 920 may be arranged in an array, but the disclosure is not limited thereto.

In the embodiment, the light-emitting device 924 of the eye tracker 920 may not be disposed on the optical combiner 110, but the disclosure is not limited thereto.

In the embodiment, the sensing device 925 of the eye tracker 920 surrounds the optical coupler 114, but the disclosure is not limited thereto.

Figure 10:
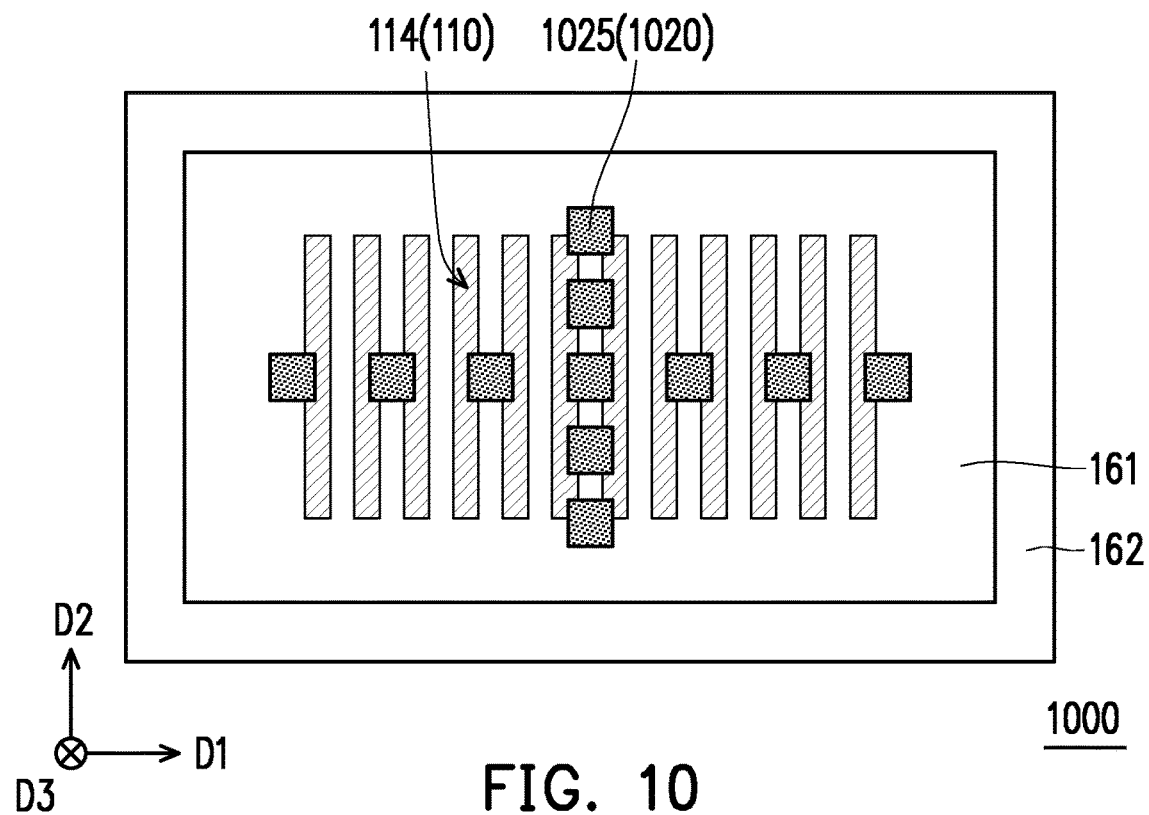
FIG. 10 is a schematic partial front view of a head-mounted eye tracking system according to the tenth embodiment of the disclosure.

FIG. 10 is a schematic partial front view of a head-mounted eye tracking system according to the tenth embodiment of the disclosure. The head-mounted eye tracking system 1000 of this embodiment is similar to the head-mounted eye tracking system 900 of the ninth embodiment, and similar components in the embodiment are denoted by the same reference numerals and have similar functions, and related description is omitted. In addition, for clarity, not all the sensing devices 1025 are marked or shown one by one in FIG. 10.

In the embodiment, the head-mounted eye tracking system 1000 includes an optical combiner 110, an eye tracker 1020, and a display (not shown directly, and may be the same or similar to the display 930 in the previous embodiment). The eye tracker 1020 may include a plurality of light-emitting devices (not shown directly, and may be the same or similar to the light-emitting devices 924 in the previous embodiment) and a plurality of sensing devices 1025. The sensing devices 1025 may be the same or similar to the sensing devices 125 in the previous embodiment.

In the embodiment, a plurality of sensing devices 1025 may be arranged in a cross shape.

Figure 11:
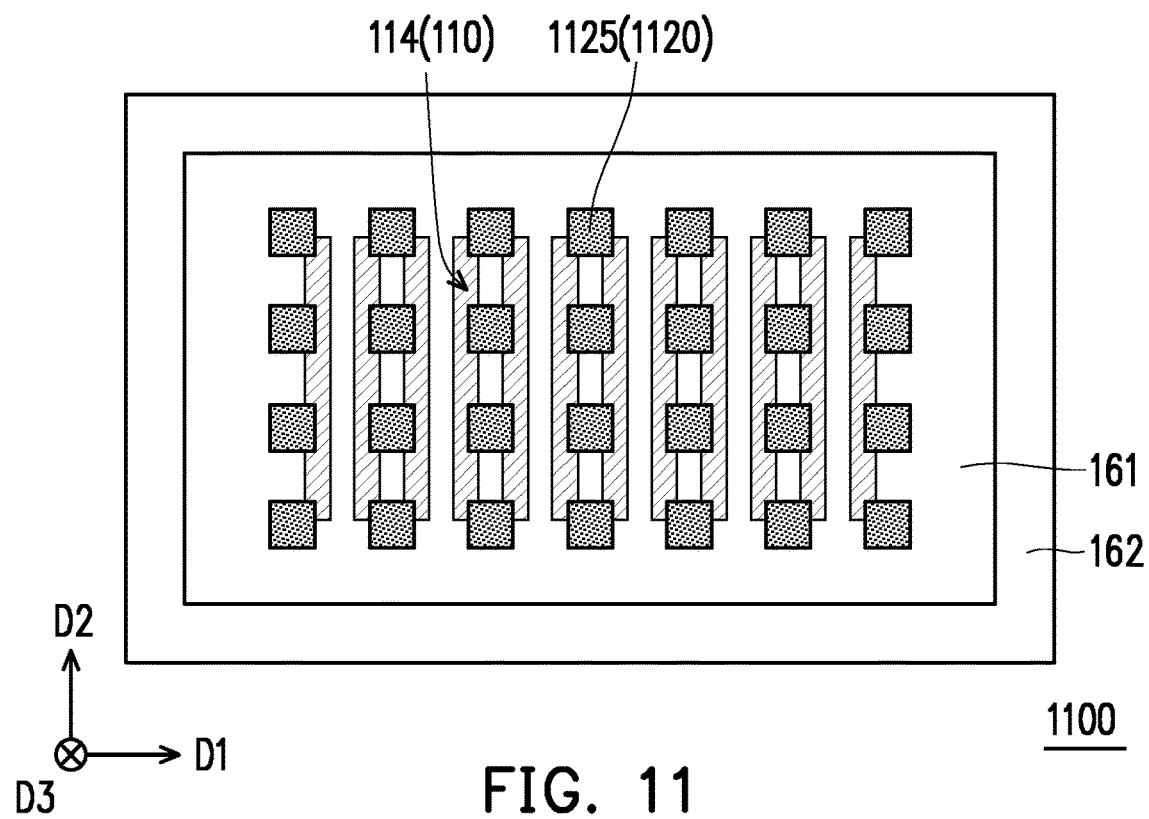
FIG. 11 is a schematic partial front view of a head-mounted eye tracking system according to the eleventh embodiment of the disclosure.

FIG. 11 is a schematic partial front view of a head-mounted eye tracking system according to the eleventh embodiment of the disclosure. The head-mounted eye tracking system 1100 in the embodiment is similar to the head-mounted eye tracking system 900 in the ninth embodiment, and similar components in the embodiment are denoted by the same reference numerals and have similar functions, and related description is omitted. In addition, for clarity, not all the sensing devices 1125 are marked or shown one by one in FIG. 11.

In the embodiment, the head-mounted eye tracking system 1100 includes an optical combiner 110, an eye tracker 1120, and a display (not shown directly, and may be the same or similar to the display 930 in the foregoing embodiment). The eye tracker 1120 may include a plurality of light-emitting devices (not directly shown, and may be the same or similar to the light-emitting devices 924 in the foregoing embodiment) and a plurality of sensing devices 1125. The sensing devices 1125 may be the same or similar to the sensing devices 125 in the previous embodiment.

In the embodiment, a plurality of sensing devices 1125 may be arranged in an array.

Figure 12:
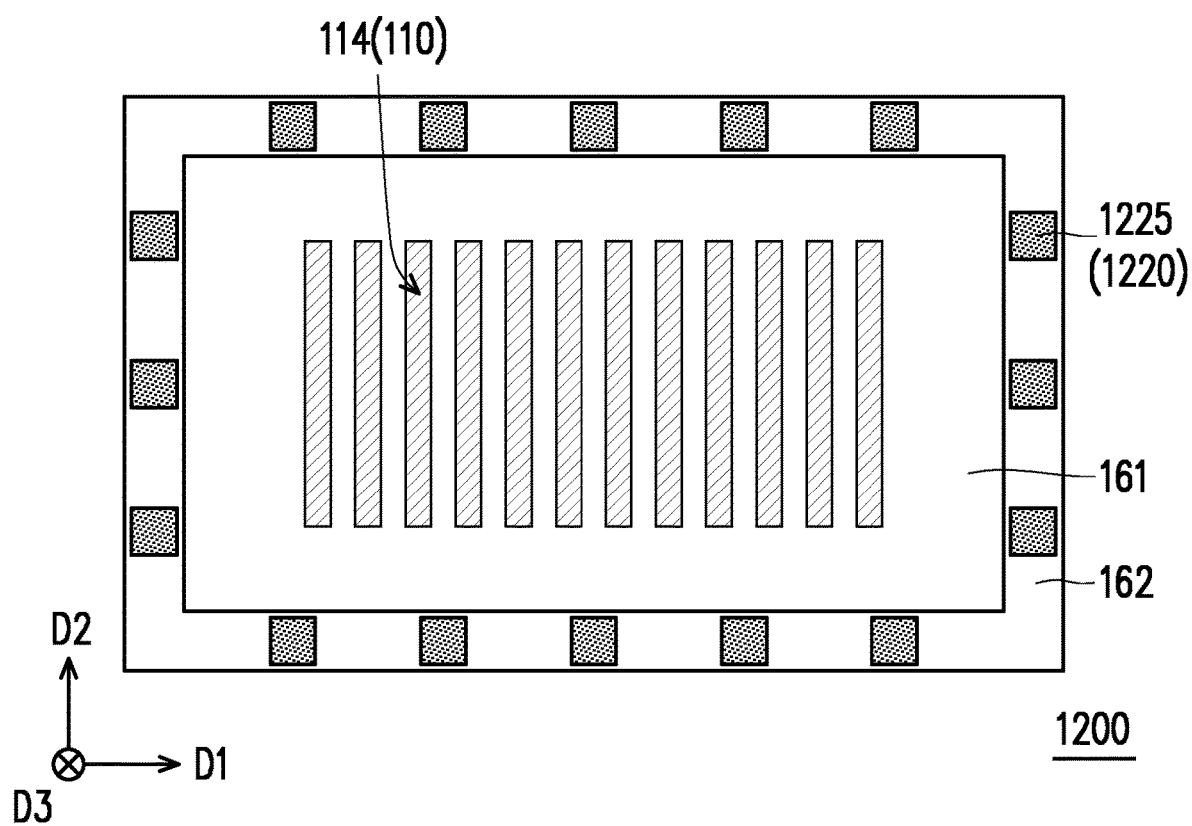
FIG. 12 is a schematic partial front view of a head-mounted eye tracking system according to the twelfth embodiment of the disclosure.

FIG. 12 is a schematic partial front view of a head-mounted eye tracking system according to the twelfth embodiment of the disclosure. The head-mounted eye tracking system 1200 in the embodiment is similar to the head-mounted eye tracking system 900 in the ninth embodiment, and similar components in the embodiment are denoted by the same reference numerals and have similar functions, and related description is omitted. In addition, for clarity, not all the sensing devices 1225 are marked or shown one by one in FIG. 12.

In the embodiment, the head-mounted eye tracking system 1200 includes an optical combiner 110, an eye tracker 1220, and a display (not shown directly, and may be the same or similar to the display 930 in the foregoing embodiment). The eye tracker 1220 may include a plurality of light-emitting devices (not shown directly, and may be the same or similar to the light-emitting devices 924 in the foregoing embodiment) and a plurality of sensing devices 1225. The sensing devices 1225 may be the same or similar to the sensing devices 125 in the previous embodiment.

In the embodiment, a plurality of sensing devices 1225 may be disposed on the frame 162.

In the embodiment, a plurality of sensing devices 1225 may surround the optical coupler 114.

Figure 13:
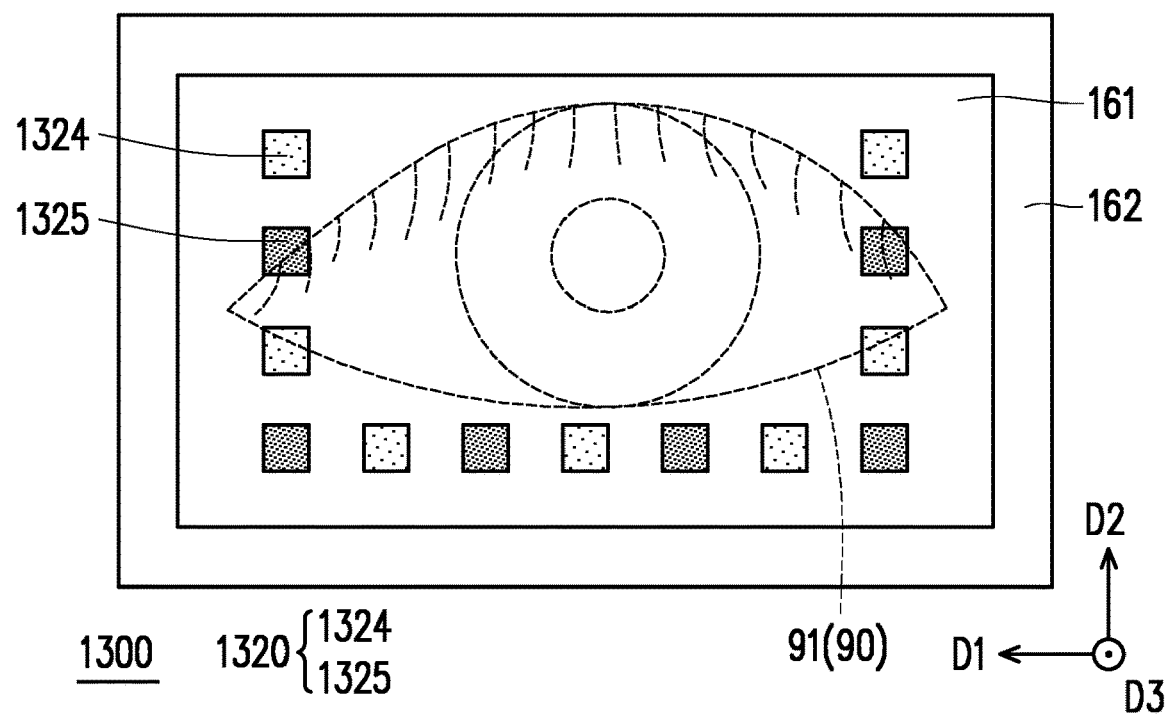
FIG. 13 is a schematic partial back view of a head-mounted eye tracking system according to the thirteenth embodiment of the disclosure.

FIG. 13 is a schematic partial back view of a head-mounted eye tracking system according to the thirteenth embodiment of the disclosure. The head-mounted eye tracking system 1300 in the embodiment is similar to any head-mounted eye tracking system in the previous embodiments. In the embodiment, the light-emitting devices 1324, the sensing devices 1325, or the light-emitting devices 1324 and the sensing devices 1325 may be disposed on the light-transmitting substrate 161, but the disclosure is not limited thereto. Also, other components included in the head-mounted eye tracking system 1300 are the same as or similar to the aforementioned embodiments. Namely, the similar components in the embodiments are denoted by the same reference numerals and have similar functions, and related description is omitted. In addition, for clarity, not all the light-emitting devices 1324 and/or sensing devices 1325 are marked or shown one by one in FIG. 13.

In the embodiment, the head-mounted eye tracking system 1300 includes an optical combiner (not shown directly, and may be the same as or similar to the optical combiner 110 or the optical combiner 610 in the foregoing embodiment) and an eye tracker 1320. The eye tracker 1320 may include a plurality of light-emitting devices 1324 and a plurality of sensing devices 1325. The light-emitting devices 1324 may be the same or similar to the light-emitting devices 124 in the previous embodiments. The sensing devices 1325 may be the same or similar to the sensing devices 125 in the previous embodiments.

The upper eyelids of most mammals are typically larger, longer, and have deeper roots than the lower eyelids. In this way, more eyelashes could be supported to protect the eyeball. There are about 90 to 160 upper eyelashes on the upper eyelids on both sides of the human being, and each upper eyelash is typically 7 to 8 mm in length, and generally do not exceed 10 mm in length. There are about 75 to 80 lower eyelashes on the lower eyelids on both sides of the human being, and each lower eyelash is typically 5 to 6 mm in length. That is, in nature, the length of the upper eyelashes is typically longer than the length of the lower eyelashes, and the number of the upper eyelashes is typically greater than the number of the lower eyelashes.

In an embodiment, the light-emitting devices 1324 and the sensing devices 1325 of an eye tracker 1320 may be disposed over the lower portion of the eyeball 91. For example, in terms of wearing the head-mounted eye tracking system 1300, the light-emitting devices 1324 and the sensing devices 1325 corresponding thereto could be farther away from the upper eyelid and/or the upper eyelashes than the lower eyelid and/or the lower eyelashes, as shown FIG. 17C (FIG. 17C will be described in detail later). In this way, the interference of upper eyelashes on the tracking beam (e.g., the tracking beam 124R or 924R as shown in FIG. 1B or 9A) could be reduced, and the optical signal quality or the corresponding electronic signal quality (e.g., the S/N ratio) received by the sensing device 1325 of the eye tracker 1320 could be improved.

In the embodiment, the light-emitting devices 1324 and/or the sensing devices 1325 may be arranged in a U shape. As shown in FIG. 13, after a wearer 90 wears the head-mounted eye tracking system 1300 thereon adaptively or reasonably, in a direction from a back view of the head-mounted eye tracking system 1300 (e.g., the direction opposite and parallel to the third arrangement direction D3), the light-emitting devices 1324 and the sensing devices 1325 of the eye tracker 1320 may be arranged in a U shape and disposed at least corresponding to the lower portion of the eyeball 91. As such, the light-emitting devices 1324 and the sensing devices 1325 corresponding thereto could be farther away from the upper eyelid and/or the upper eyelashes than the lower eyelid and/or the lower eyelashes. In the embodiment, the light-emitting devices 1324 and the sensing devices 1325 of the eye tracker 1320 may be disposed further corresponding to the left and right portions of the eyeball 91.

In the embodiment, on a corresponding U shape, the light-emitting devices 1324 and/or the sensing devices 1325 may be arranged alternately, but the disclosure is not limited thereto.

In the embodiment, the light-emitting device 1324 and the sensing device 1325 adjacent to each other may be integrated into a sensing unit (e.g., a sensing unit SU1 as shown in FIG. 1D). In an embodiment not shown, one or more light-emitting device 1324 and one or more sensing device 1325 may be integrated into a sensing unit the same or similar to the sensing unit SU2 as shown in FIG. 1E or the sensing unit SU3 as shown in FIG. 1F.

Figure 14:
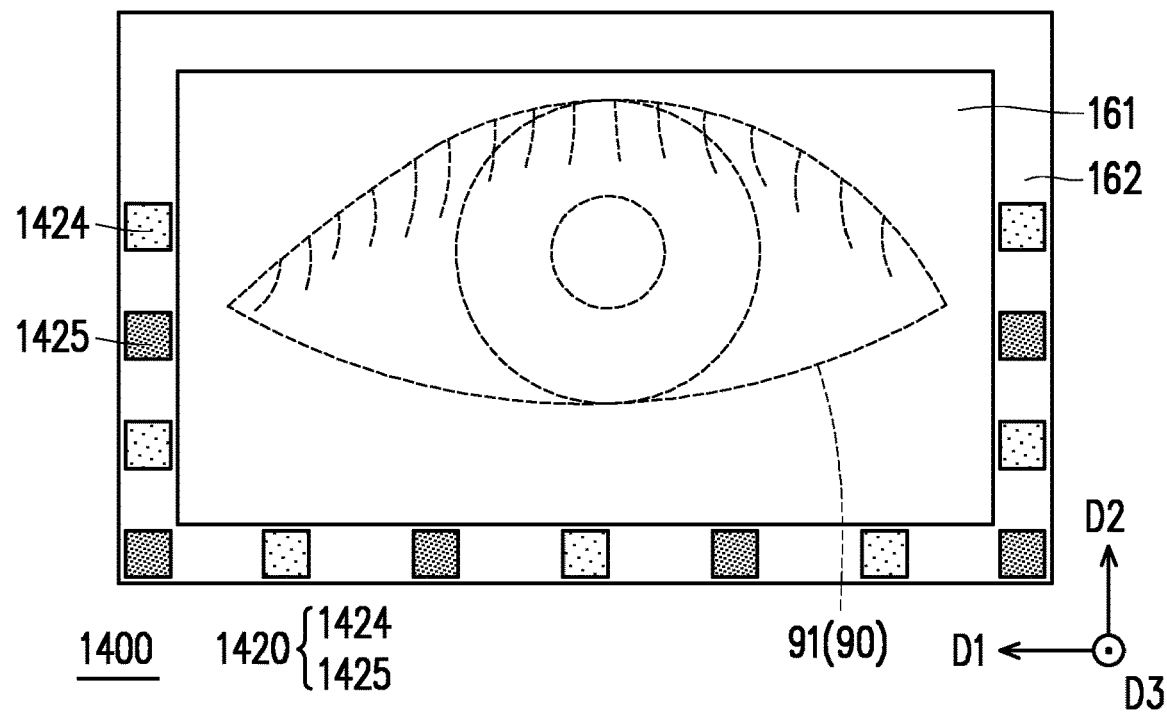
FIG. 14 is a schematic partial back view of a head-mounted eye tracking system according to the fourteenth embodiment of the disclosure.

FIG. 14 is a schematic partial back view of a head-mounted eye tracking system according to the fourteenth embodiment of the disclosure. The head-mounted eye tracking system 1400 in the embodiment is similar to any head-mounted eye tracking system in the previous embodiments. In the embodiment, the light-emitting devices 1424 and/or the sensing devices 1425 may be disposed on the frame 162, but the disclosure is not limited thereto. Also, other components included in the head-mounted eye tracking system 1400 are the same as or similar to the aforementioned embodiments. Namely, the similar components in the embodiments are denoted by the same reference numerals and have similar functions, and related description is omitted. In addition, for clarity, not all the light-emitting devices 1424 and/or sensing devices 1425 are marked or shown one by one in FIG. 14.

In the embodiment, the head-mounted eye tracking system 1400 includes an optical combiner (not shown directly, and may be the same as or similar to the optical combiner 110 or the optical combiner 610 in the foregoing embodiment) and an eye tracker 1420. The eye tracker 1420 may include a plurality of light-emitting devices 1424 and a plurality of sensing devices 1425. The light-emitting devices 1424 may be the same or similar to the light-emitting devices 124 in the previous embodiments. The sensing devices 1425 may be the same or similar to the sensing devices 125 in the previous embodiments.

In the embodiment, the light-emitting devices 1424 and/or the sensing devices 1425 may be arranged in a U shape. As shown in FIG. 14, after a wearer 90 wears the head-mounted eye tracking system 1400 thereon adaptively or reasonably, in a direction from a back view of the head-mounted eye tracking system 1400 (e.g., the direction opposite and parallel to the third arrangement direction D3), the light-emitting devices 1424 and the sensing devices 1425 of the eye tracker 1420 may be arranged in a U shape and disposed corresponding to the lower portion of the eyeball. That is, the light-emitting devices 1424 and the sensing devices 1425 corresponding thereto could be farther away from the upper eyelid and/or the upper eyelashes than the lower eyelid and/or the lower eyelashes.

Figure 15A:
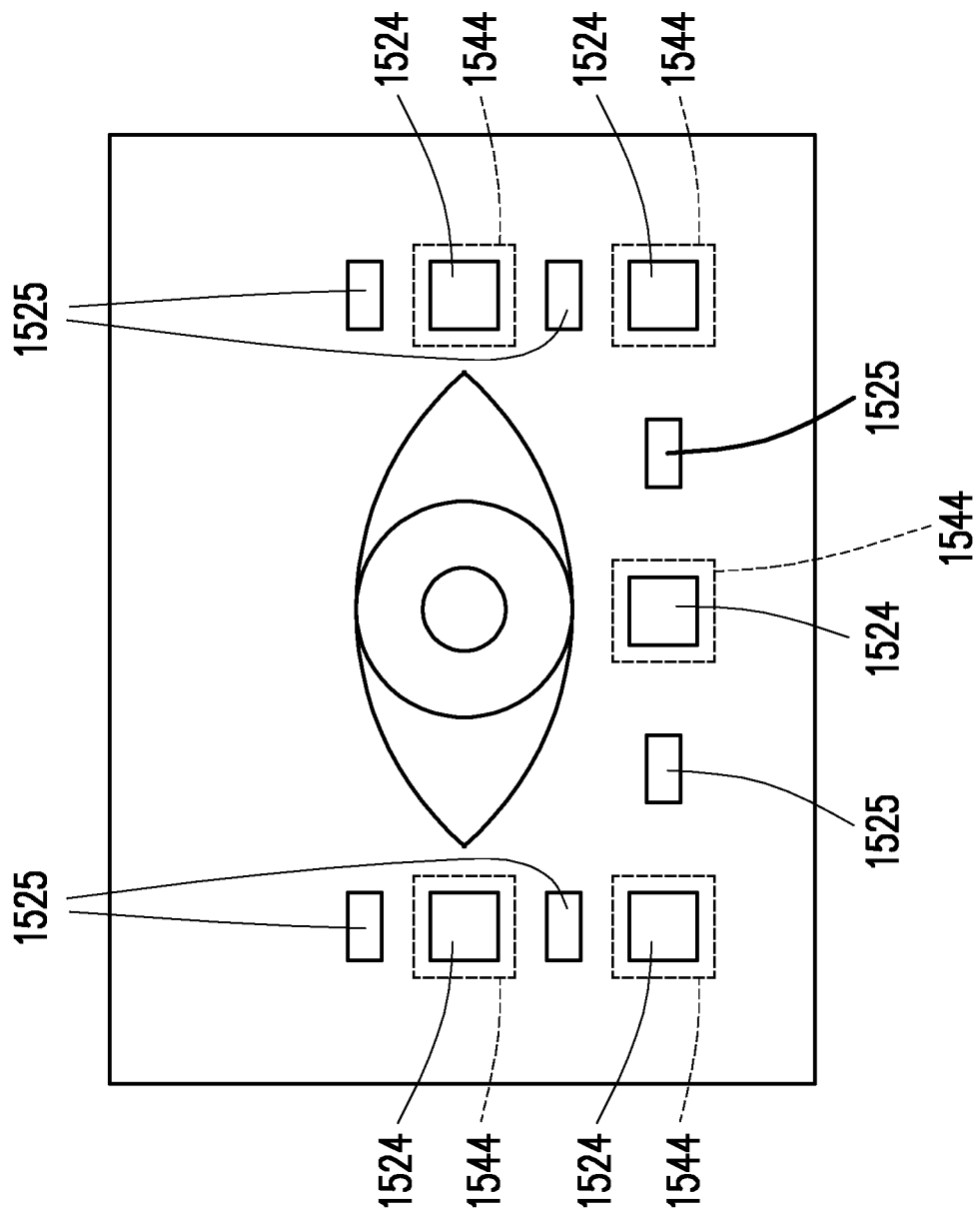
FIGS. 15A-15C are schematic partial views of a head-mounted eye tracking system according to the fifteenth embodiment of the disclosure.
Figure 15C:
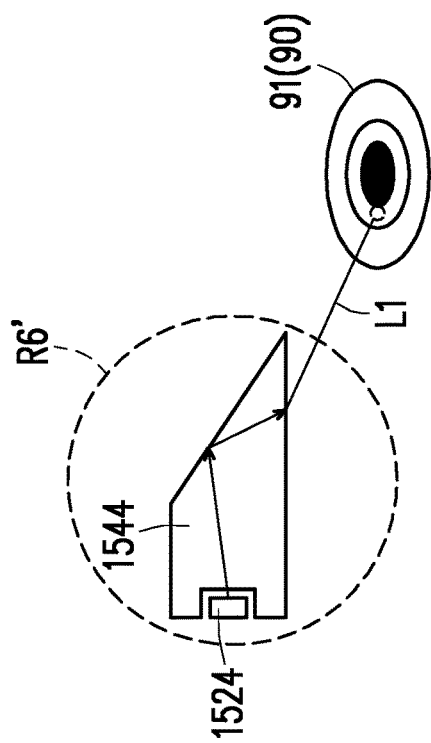
Figure 15B:
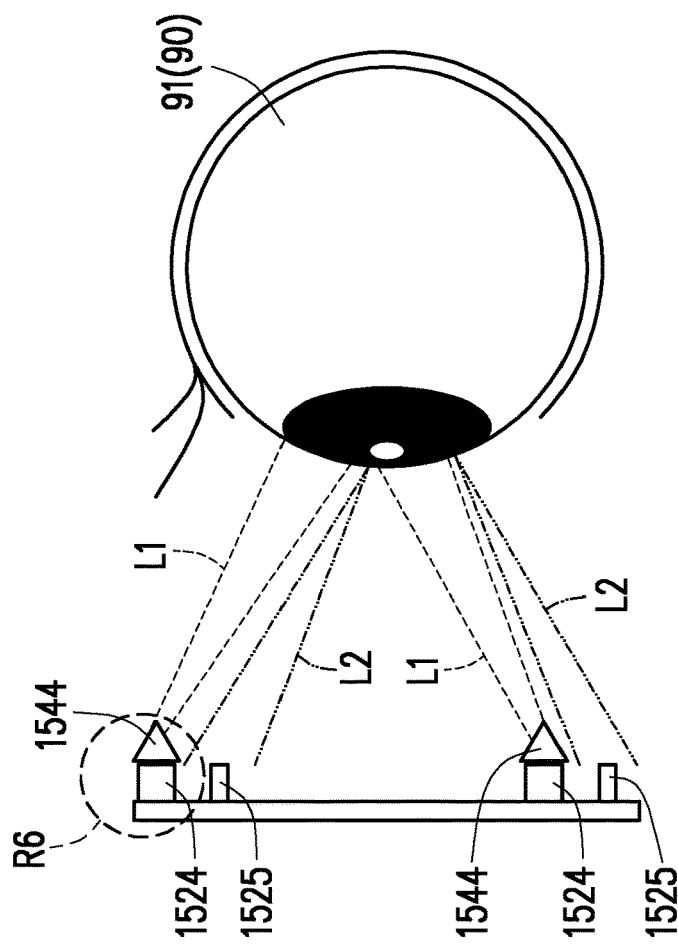

FIGS. 15A-15C are schematic partial views of a head-mounted eye tracking system according to the fifteenth embodiment of the disclosure. For example, the range R6' involving a light-emitting device 1524 and an optical guide 1544 as shown in FIG. 15C may correspond to the range R6 as shown in FIG. 15B. It is worth noting that FIGS. 15A-15C are exemplary illustrations for disclosing the relationship of each device, corresponding light, and wearer in a clear and/or simple manner. As such, the relative positions or orientations of each device, corresponding light, and/or wearer as shown in FIGS. 15A-15C are not thereby limited.

In the embodiment, the head-mounted eye tracking system may include an optical combiner (not shown directly, and may be the same as or similar to the optical combiner 110 or the optical combiner 610 in the foregoing embodiment) and an eye tracker 1520. The eye tracker 1520 may include a plurality of light-emitting devices 1524 and a plurality of sensing devices 1525. The light-emitting devices 1524 may be the same or similar to the light-emitting devices 124 in the previous embodiments. The sensing devices 1525 may be the same or similar to the sensing devices 125 in the previous embodiments. A suitable optical guide (may be referred as a light-emitting optical guide) 1544 may be disposed on the corresponding light-emitting device 1524. As such, the direction of the principal ray emitted from the sensing device 1525 may be changed by being guided by the corresponding optical guide 1544. A light spot shape of the light beam that is being guided and passes through the optical guide could be more concentrated on the specific area. As such, the intensity or quality of the sensing signal obtained by the sensing devices 125 for sensing the reflected light could be improved.

Figure 16C:
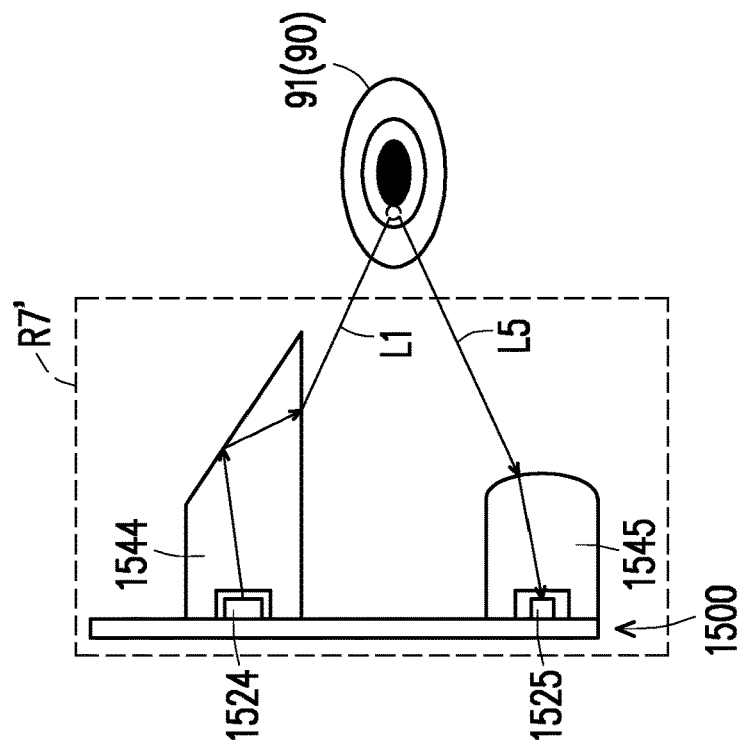
Figure 16B:
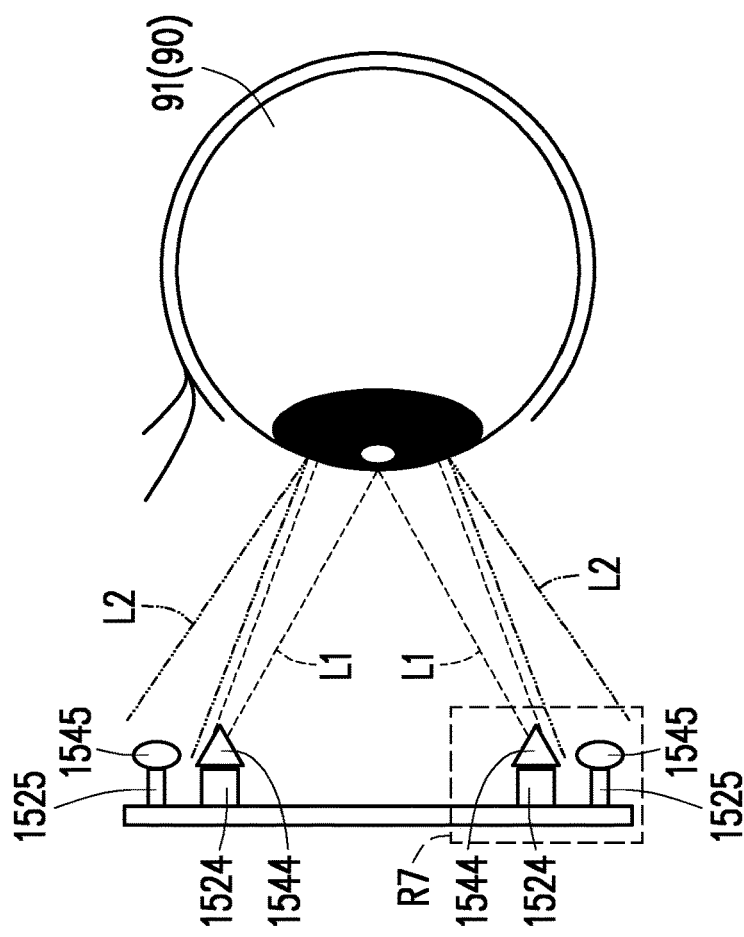

FIGS. 16A-16C are schematic partial views of a head-mounted eye tracking system according to the sixteenth embodiment of the disclosure. For example, the range R7' involving a light-emitting device 1524, an optical guide 1544, a sensing device 1525, and an optical guide 1545 as shown in FIG. 16C may correspond to the range R7 as shown in FIG. 16B. It is worth noting that FIGS. 16A-16C are exemplary illustrations for disclosing the relationship of each device, corresponding light, and wearer in a clear and/or simple manner. As such, the relative positions or orientations of each device, corresponding light, and/or wearer as shown in FIGS. 16A-16C are not thereby limited.

In the embodiment, a suitable optical guide (may be referred as a sensing optical guide) 1545 may be disposed on the corresponding sensing device 1525. The optical guide 1545 may increase the amount of light L5 entering the corresponding sensing device 1525, and the optical signal quality or the corresponding electronic signal quality (e.g., the S/N ratio) received by the sensing device 1325 may be improved.

Figure 17A:
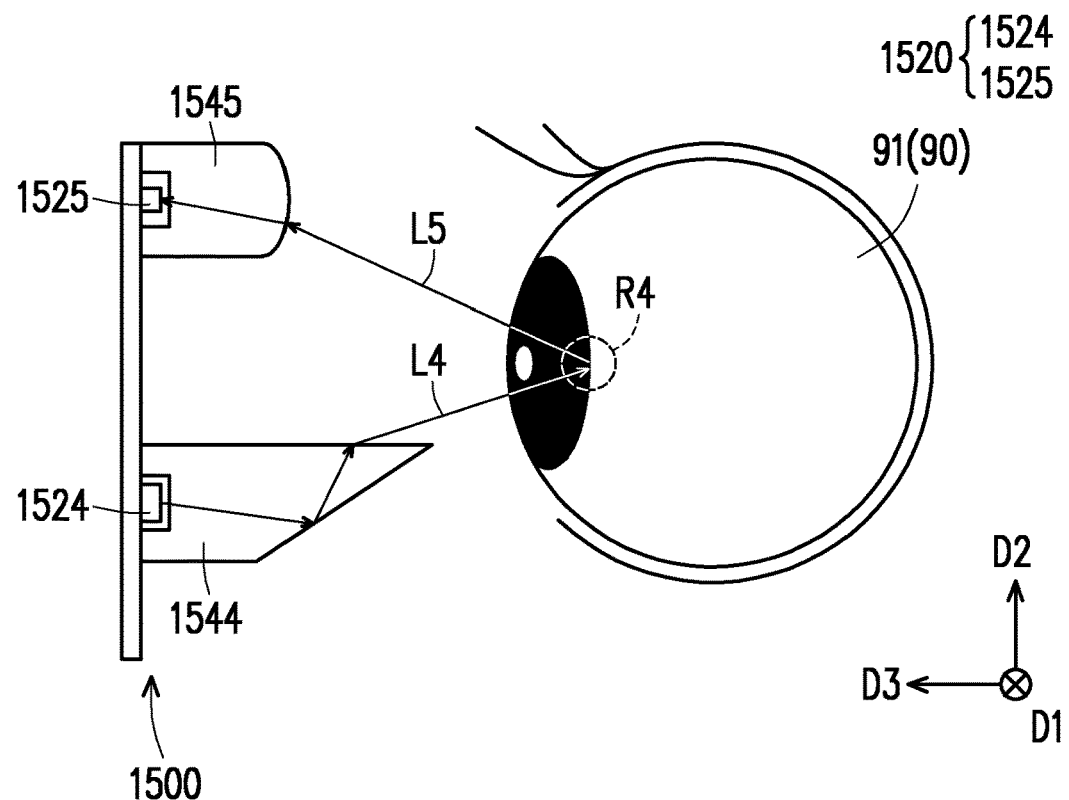
FIG. 17A is a schematic partial side view of a head-mounted eye tracking system according to the seventeenth embodiment of the disclosure.
Figure 17B:
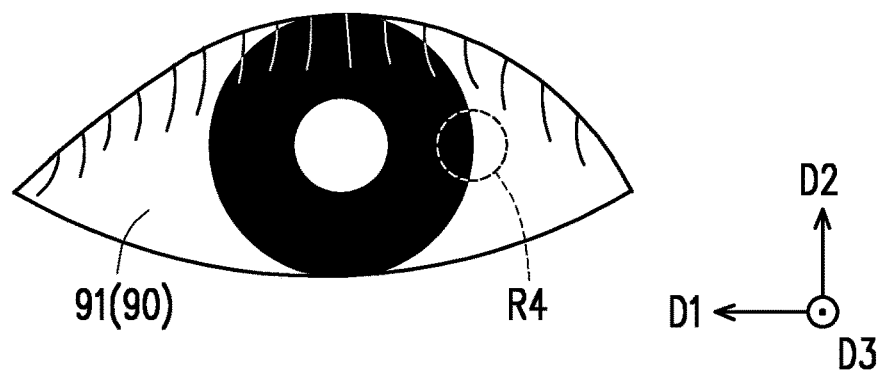
FIG. 17B is a schematic partial front view of a wearer wearing a head-mounted eye tracking system according to the seventeenth embodiment of the disclosure.
Figure 17C:
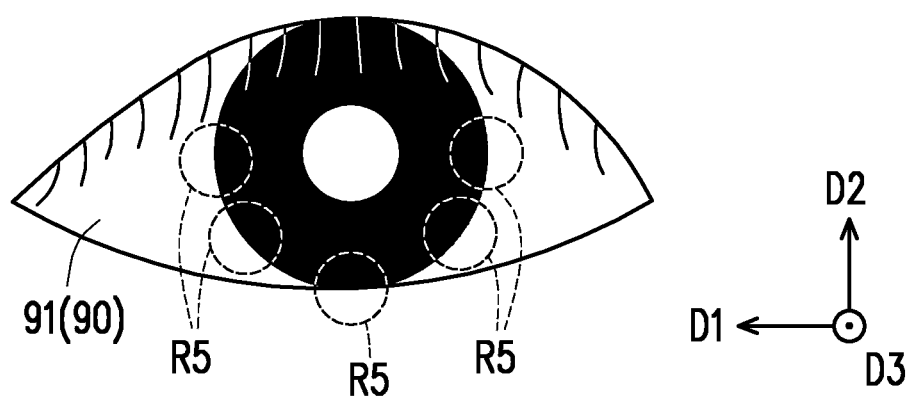
FIG. 17C is a schematic partial front view of a wearer wearing a head-mounted eye tracking system according to an embodiment of the disclosure.

FIG. 17A is a schematic partial side view of a head-mounted eye tracking system according to the seventeenth embodiment of the disclosure. FIG. 17B is a schematic partial front view of a wearer wearing a head-mounted eye tracking system according to the fifteenth embodiment of the disclosure. The head-mounted eye tracking system 1500 in the embodiment is similar to any head-mounted eye tracking system in the previous embodiments. In the embodiment, a suitable optical guide (may be referred as a sensing optical guide) 1545 may be disposed on the corresponding sensing device 1525. The optical guide 1545 may increase the amount of light L5 entering the corresponding sensing device 1525. Also, other components included in the head-mounted eye tracking system 1500 are the same as or similar to the aforementioned embodiments. Namely, the similar components in the embodiments are denoted by the same reference numerals and have similar functions, and related description is omitted. In addition, for clarity, not all the light-emitting devices 1524, the optical guide 1544, sensing devices 1525, and/or the optical guide 1545 are marked or shown one by one in FIGS. 17A-17B.

In the embodiment, the head-mounted eye tracking system 1500 includes an optical combiner (not shown directly, and may be the same as or similar to the optical combiner 110 or the optical combiner 610 in the foregoing embodiment) and an eye tracker 1520. The eye tracker 1520 may include a plurality of light-emitting devices 1524 and a plurality of sensing devices 1525. The light-emitting devices 1524 may be the same or similar to the light-emitting devices 124 in the previous embodiments. The sensing devices 1525 may be the same or similar to the sensing devices 125 in the previous embodiments.

In the embodiment, a suitable optical guide (may be referred as a light-emitting optical guide) 1544 may be disposed on the corresponding light-emitting device 1524. As such, the direction of the principal ray emitted from the sensing device 1525 may be changed by being guided by the corresponding optical guide 1544.

In an embodiment, the optical guide 1544 may be directly contacted to the corresponding light-emitting device 1524. For example, the optical guide 1544 may be formed by etching the light-transmitting material (e.g., epoxy, acrylic, silicon, but not limited) directly formed on the corresponding light-emitting device 1524.

In an embodiment, the optical guide 1544 may be indirectly disposed on the corresponding light-emitting device 1524. For example, the optical guide 1544 may be a pre-formed element. The pre-formed optical guide may be disposed on the corresponding light-emitting device 1524 by an adhesive material (e.g., epoxy resin, acrylic resin, silicon resin, but not limited).

In the embodiment, the optical guide 1544 may be a prism, a micro prism, or a fresnel prism, but the disclosure is not limited thereto. In an embodiment, an optical guide similar to the optical guide 1544 may be a lens, a micro lens, a fresnel lens, a metalens, an optical fiber, and/or a light pipe.

As shown in FIGS. 17A and 17B, the principal ray may be guided and directed to a specific area or vicinity thereof by adjusting the optical guide 1544. In FIGS. 17A and 17B, the area R4 may be a portion of the specific area, and the area R4 could be corresponded to the principal ray L4 emitted from one sensing device 1525 and further may be changed by being guided by one corresponding optical guide 1544.

In an embodiment, considering eye movements under a normal or reasonable condition, the aforementioned specific area may be the outer peripheral of the iris of the eyeball 91 of the wearer 90 when looking straight ahead. In the directly detectable area outside the eyeball 91, there is an obvious color difference or light-dark difference at the outer edge of the iris. Moreover, the outer peripheral contour of the iris may be less affected by pupil constriction or pupil dilation. As such, sensing devices 1525 may have a larger response difference between the stronger light signal and the weaker light signal. The stability and/or accuracy of eyeball visual direction tracking by the head-mounted eye tracking system 1500 may be improved.

It is worth noting that only one of the aforementioned specific area corresponding to one light-emitting device 1524 and/or one optical guide 1544 is exemplary shown in FIGS. 17A and 17B. In an embodiment, as shown in FIG. 17C, a plurality of specific areas R5 (similar to the area R4 in terms of size but different in terms of position) corresponding to the plurality of light-emitting device 1524 and/or the plurality of optical guide 1544 may be distributed along an arc area or ring area corresponding to the outer peripheral of the iris of the eyeball 91 of the wearer 90 when looking straight ahead.

Figure 18:
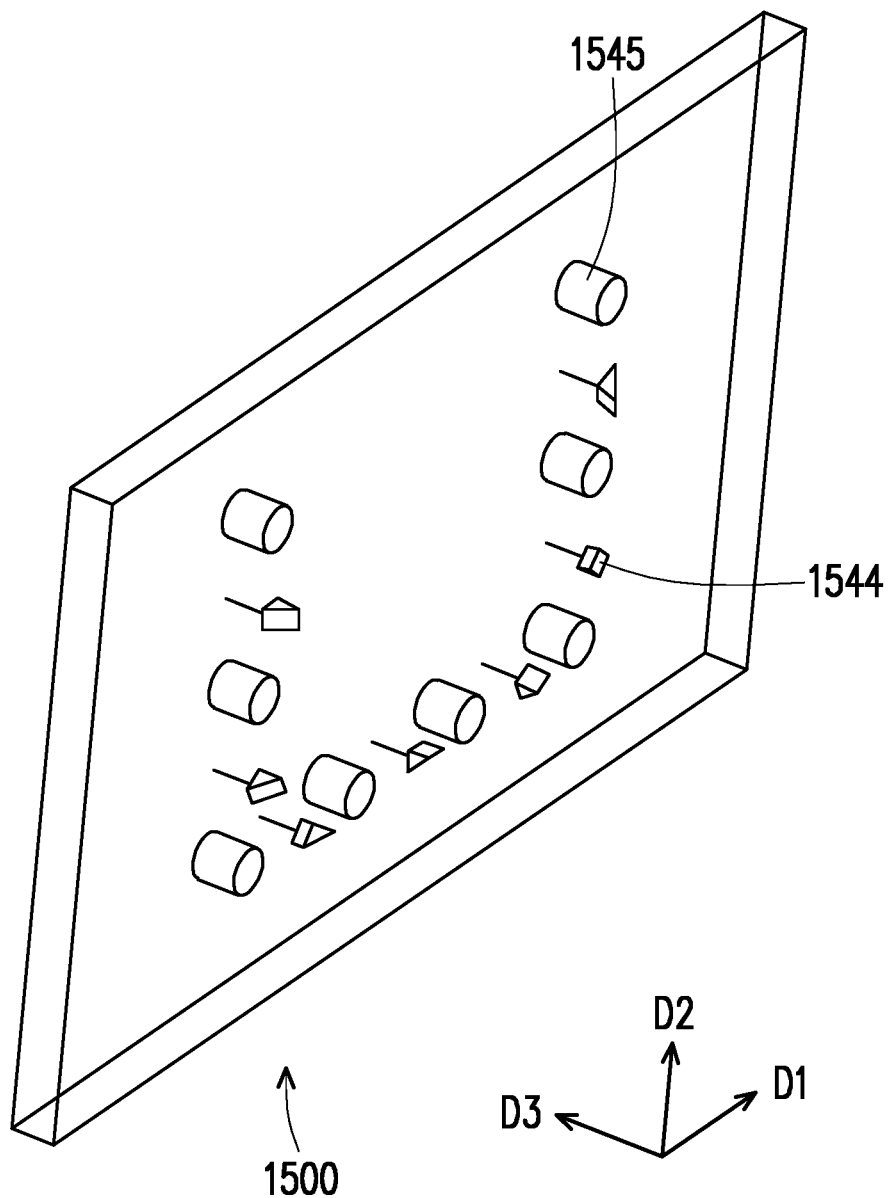
FIG. 18 is a schematic partial perspective view of a head-mounted eye tracking system according to the eighteenth embodiment of the disclosure.

FIG. 18 is a schematic partial perspective view of a head-mounted eye tracking system according to the eighteenth embodiment of the disclosure. The eighteenth embodiment of the disclosure may be integrated with any previous embodiments or an embodiment similar thereof. That is, for clarity, any element(s), and/or device(s) not shown in FIG. 18 may refer to other drawings and corresponding descriptions. For example, as shown in FIG. 18, the light-emitting devices and the sensing devices of the eye tracker may be arranged in a U shape and disposed corresponding to the lower portion of the eyeball. The area formed by the guided and directed principal ray of each light-emitting device may be distributed as an arc area corresponding to a lower portion of the outer peripheral of the iris of the eyeball 91 of the wearer 90 when looking straight ahead.

In an embodiment, the optical guide 1545 may be directly contacted to the corresponding sensing device 1525. For example, the optical guide 1545 may be formed by etching the light-transmitting material (e.g., epoxy, acrylic, silicon, but not limited) directly formed on the corresponding sensing device 1525.

In an embodiment, the optical guide 1545 may be indirectly disposed on the corresponding sensing device 1525. For example, the optical guide 1545 may be a pre-formed element. The pre-formed optical guide may be disposed on the corresponding sensing device 1525 by an adhesive material (e.g., epoxy resin, acrylic resin, silicon resin, but not limited).

In the embodiment, the sensing devices 1525 may be a lens, but the disclosure is not limited thereto.

In an embodiment, the optical guide 1544 may be indirectly disposed on the corresponding light-emitting device 1524, and the optical guide 1545 may be indirectly disposed on the corresponding sensing device 1525. For example, the optical guide 1544 and the optical guide 1545 may be disposed on an optical film, a substrate, or a portion of the optical film or the substrate. The optical film or substrate having the optical guide 1544 and the optical guide 1545 may be disposed on the eye tracker 1520, and the optical guide 1544 and the optical guide 1545 thereon could correspond to the light-emitting device 1524 and the sensing devices 1525, respectively.

Figure 19:
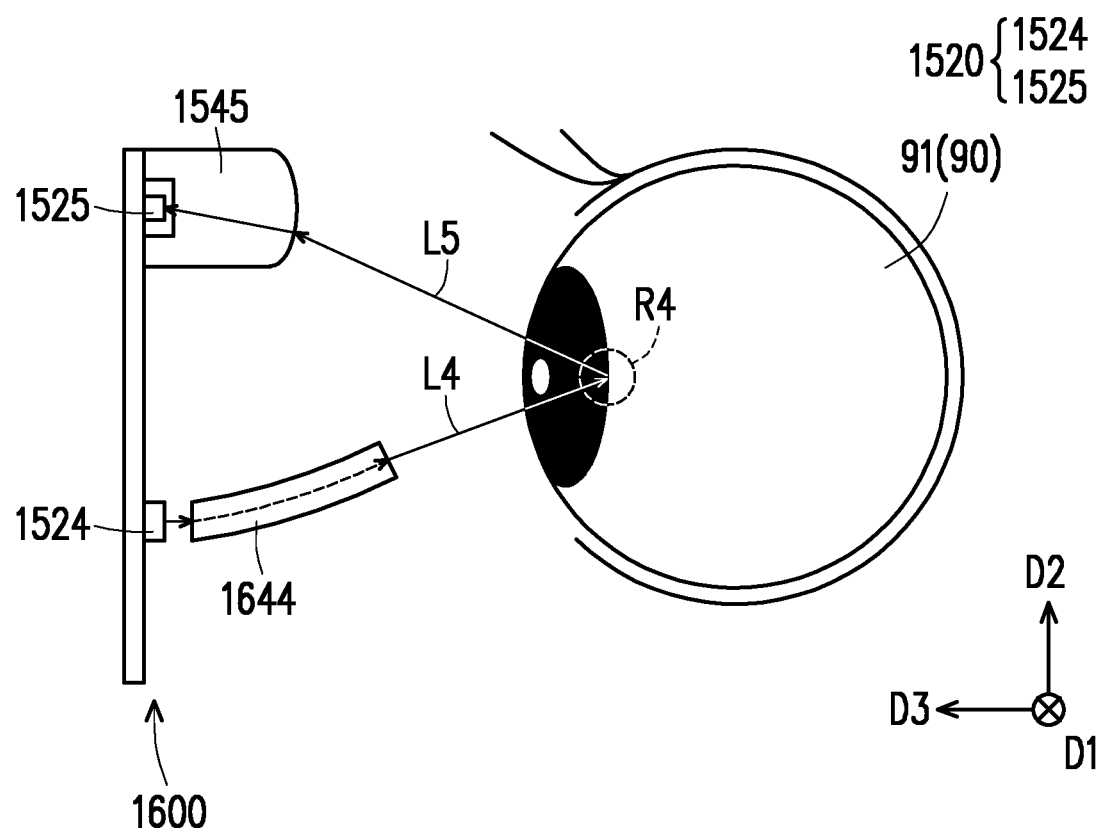
FIG. 19 is a schematic partial side view of a head-mounted eye tracking system according to the nineteenth embodiment of the disclosure.

FIG. 19 is a schematic partial side view of a head-mounted eye tracking system according to the nineteenth embodiment of the disclosure. The head-mounted eye tracking system 1600 in the embodiment is similar to any head-mounted eye tracking system in the previous embodiments. In the embodiment, a suitable optical guide 1644 may be disposed on the corresponding light-emitting device 1524. In the embodiment, the optical guide 1644 may be an optical fiber and/or a light pipe. Also, other components included in the head-mounted eye tracking system 1500 are the same as or similar to the aforementioned embodiments. Namely, the similar components in the embodiments are denoted by the same reference numerals and have similar functions, and related description is omitted.

Figure 20A:
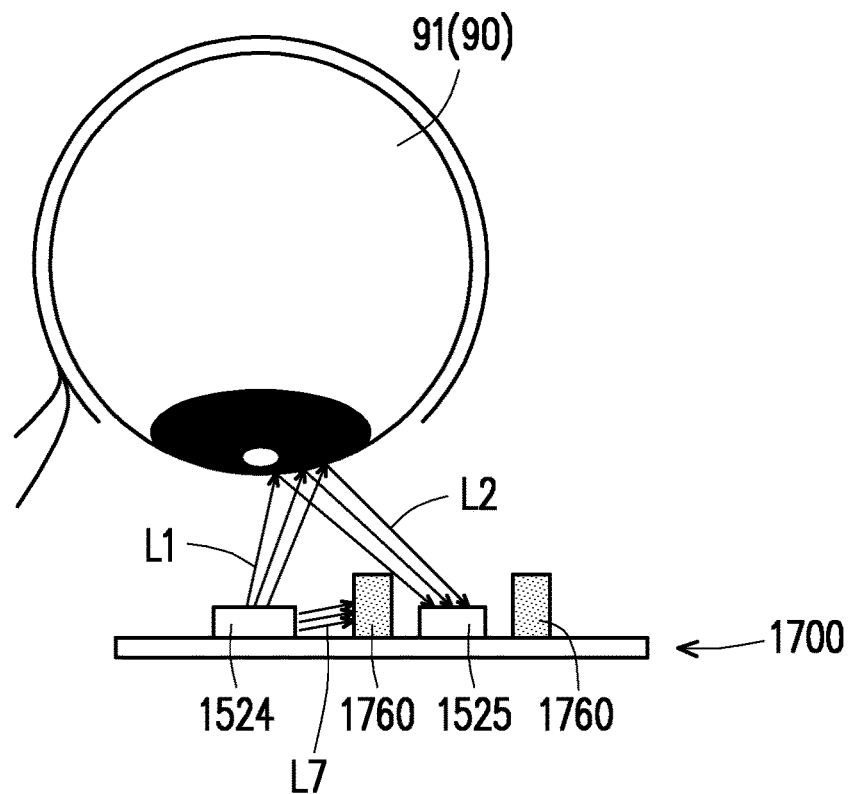
FIG. 20A is a schematic partial side view of a head-mounted eye tracking system according to the twentieth embodiment of the disclosure.
Figure 20B:
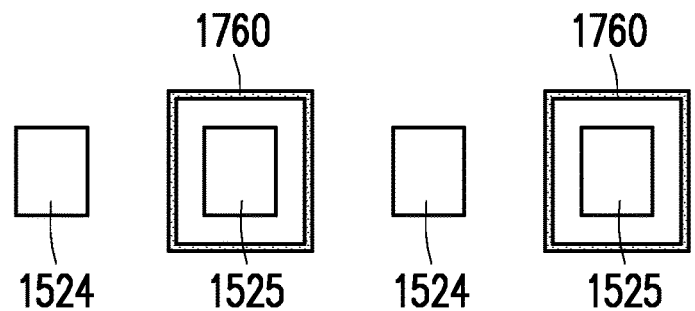
FIG. 20B is a schematic partial side view of a head-mounted eye tracking system according to the twenty-first embodiment of the disclosure.

FIG. 20A is a schematic partial side view of a head-mounted eye tracking system according to the twentieth embodiment of the disclosure. FIG. 20B is a schematic partial side view of a head-mounted eye tracking system according to the twenty-first embodiment of the disclosure.

The head-mounted eye tracking system 1700 in the embodiment is similar to any head-mounted eye tracking system in the previous embodiments. In the embodiment, a light shading structure 1760 may be disposed at least between the light-emitting device 1524 and the sensing devices 1525. The light shading structure 1760 may block or shade the light L7 directly emitted from the light-emitting device 1524 to the sensing device 1525 by absorption or reflection. As such, the effect of the sensing device 1525 from unexpected interference (e.g., a light that is not reflected from the eyeball 91) may be reduced, and the optical signal quality or the corresponding electronic signal quality (e.g., the S/N ratio) received by the sensing device 1525 could be improved.

In an embodiment, a material of the light shading structure 1760 may be silicon or rubber, but the disclosure is not limited thereto. In an embodiment, a color of the light shading structure 1760 may be white or black, but the disclosure is not limited thereto.

In an embodiment, as shown in FIG. 20B, in a top view, the light shading structure 1760 may surround the sensing device 1525.

Figure 21:
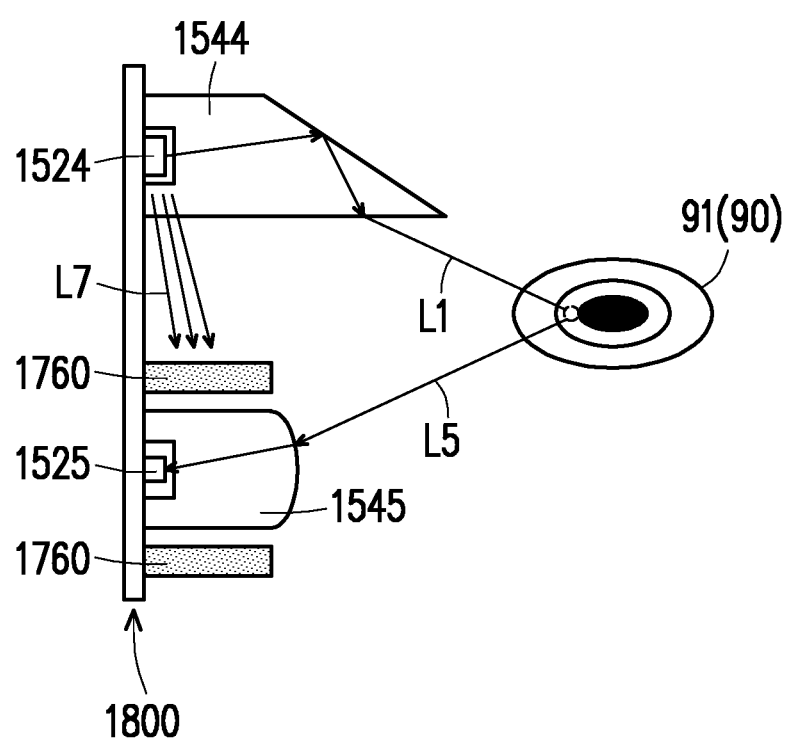
FIG. 21 is a schematic partial view of a head-mounted eye tracking system according to the twenty-first embodiment of the disclosure.

FIG. 21 is a schematic partial view of a head-mounted eye tracking system according to the twenty-first embodiment of the disclosure. The head-mounted eye tracking system 1800 in the embodiment is similar to any head-mounted eye tracking system in the previous embodiments. In the embodiment, a suitable optical guide (may be referred as a light-emitting optical guide) 1544 may be disposed on the corresponding light-emitting device 1524, a suitable optical guide (may be referred as a sensing optical guide) 1545 may be disposed on the corresponding sensing device 1525, and a light shading structure 1760 may be disposed at least between the light-emitting device 1524 and the sensing devices 1525.

In the disclosure, an embodiment may be integrated with another embodiment to be other embodiments.

For example, in an embodiment which may not be directly shown in a single embodiment, a head-mounted eye tracking system includes a light-transmitting substrate (e.g., labelled as "161" in the aforementioned drawing), at least two eye trackers (e.g., labelled as "1320" in the aforementioned drawing), a signal processor, and a plurality of light-emitting optical guides. The light-transmitting substrate is made from materials that allows light to pass through. The at least two eye trackers are adaptable for sensing eyeballs of a wearer on the light-transmitting substrate. Each eye tracker includes a light-emitting device and a sensing device. The light-emitting device is adaptable for emitting a tracking beam. The sensing device is adjacent to the light-emitting device and is adaptable for receiving the tracking beam reflected from the eyeballs of the wearer. The signal processor is signally connected to both of the eye trackers. The plurality of light-emitting optical guides is at a position matching the plurality of light-emitting devices.

For example, in an embodiment which may not be directly shown in a single embodiment, both of the eye trackers are arranged along an inner rim of the light-transmitting substrate.

For example, in an embodiment which may not be directly shown in a single embodiment, both of the eye trackers include a plurality of eye trackers, and each light-emitting device and each sensing device are alternatively arranged.

For example, in an embodiment which may not be directly shown in a single embodiment, one of the light-emitting optical guides is arranged in front of one of the light-emitting devices to direct the light to another position corresponding to a boundary between the iris and the sclera of one of the eyeballs.

For example, in an embodiment which may not be directly shown in a single embodiment, one of the light-emitting optical guides is arranged in front of one of the sensing devices, and the light-emitting optical guide of the sensing device is configured to direct the light to the same position as the light-emitting optical guide of the light-emitting device.

For example, in an embodiment which may not be directly shown in a single embodiment, both of the eye trackers are integrated into the light-transmitting substrate.

EXAMPLES

The following examples are shown to describe the disclosure, but the disclosure should not be construed as being limited by the following examples.

Example 1

Example 1 is used to illustrate a simulated light spot shape corresponding to an embodiment of the disclosure.

Figure 22B:
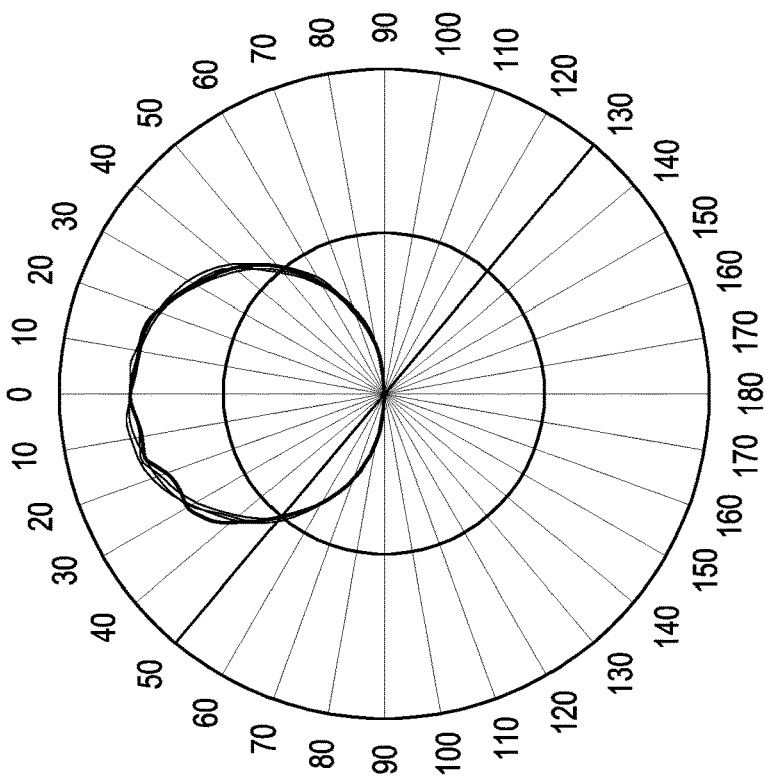
FIG. 22B illustrates another simulated light spot shape.
Figure 22A:
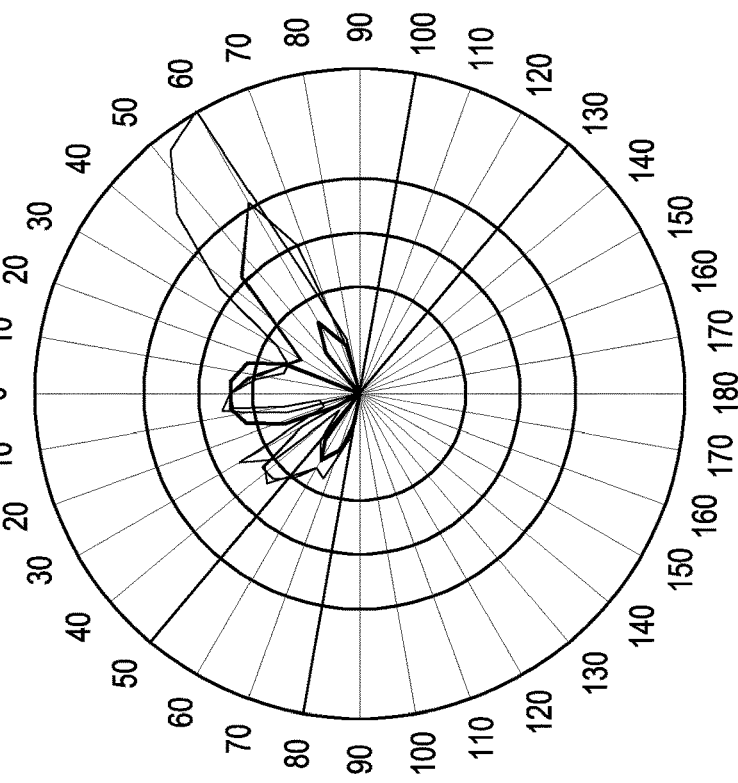
FIG. 22A illustrates a simulated light spot shape.

The light spot shape as shown in FIGS. 22A and 22B could be illustrated by a common or commercial optical simulation software.

FIG. 22A illustrates a simulated light spot shape of a light beam that is being guided and passes through an optical guide (e.g., an optical guide the same or similar to the optical guide 1544) and irradiated to a corresponding specific area (e.g., a specific area the same or similar to the specific area R4 as shown in FIG. 17B) of the eyeball. FIG. 22B illustrates another simulated light spot shape of a light beam that is not being guided and passes through any optical guide and irradiated to the corresponding specific area of the eyeball.

As shown in FIGS. 22A and 22B, the principal ray may be guided and directed to the specific area or vicinity thereof by adjusting the optical guide. Moreover, the light spot shape of the light beam that is being guided and passes through the optical guide could be more concentrated on the specific area.

Example 2

Example 2 may be used to illustrate the sensing signal corresponding to an embodiment of the disclosure.

Figure 23A:
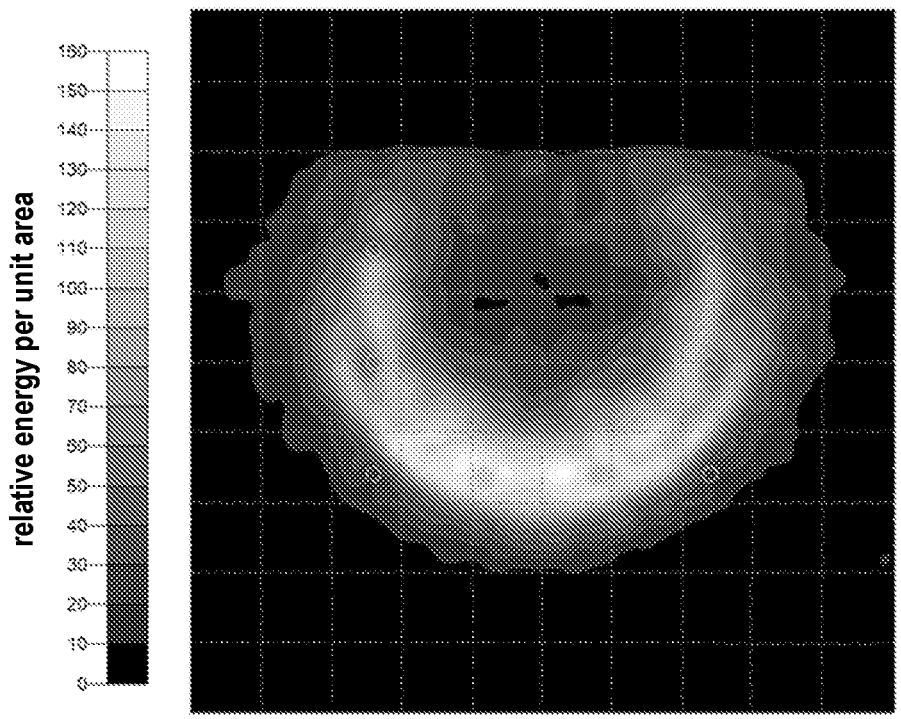
FIGS. 23A, 24A, 25A, 26A, 27A, 28A, 29A, 30A, 31A, and 32A are schematic graphical diagrams for representing the sensing signal of an example of the disclosure.

FIGS. 23A, 24A, 25A, 26A, 27A, 28A, 29A, 30A, and 31A are schematic graphical diagrams for representing the sensing signal of an example of the disclosure. FIGS. 23B, 24B, 25B, 26B, 27B, 28B, 29B, 30B, and 31B are schematic diagrams of the visual direction of the eyeball of an example of the disclosure. In particular, FIG. 23A is a corresponding graphical diagram representing the sensing signals obtaining from the plurality of sensing devices of the head-mounted eye tracking system of the example (e.g., the same or similar to the head-mounted eye tracking system 1500) when the eyeball has a visual direction as shown in FIG. 21B. Similarly, FIGS. 24A, 25A, 26A, 27A, 28A, 29A, 30A, and 31A are corresponding graphical diagrams representing the sensing signals obtaining from the plurality of sensing devices of the head-mounted eye tracking system of the example when the eyeball has a visual direction as shown in FIGS. 24B, 25B, 26B, 27B, 28B, 29B, 30B, and 31B, respectively.

In an exemplary test mode, a wearer (e.g., a wearer 90) could be asked to wear a head-mounted eye tracking system of the disclosure (e.g., a head-mounted eye tracking system 1500) adaptively or reasonably. Then, the same or similar to the general autorefractor test, a test mark or picture (e.g., a farmhouse or a hot air balloon, but not limited) could be displayed at a specific position on the display (e.g., the display 130) of the head-mounted eye tracking system. The wearer could be asked to focus on the test picture or mark to keep the visual direction of the eyeball (e.g., an eyeball 91). At this time, the eye tracker of the head-mounted eye tracking system could be enabled to obtaining the sensing signal corresponding to the eyeball with the visual direction. By changing the position of the test picture or mark on the display, different sensing signals corresponding to different visual directions of the eyeball could be obtained through changes in the focus of the wearer's eyes. By collecting signals at different points, a visual direction and/or eye movement of the wearer could be confirmed or corrected.

It is worth noting that since the eye tracker (e.g., the eye tracker 1520) of the head-mounted eye tracking system detects the visual direction of the eyeball in an eyeball-facing manner, sensing signals corresponding to the visual directions of the eyeball may be presented in a mirror-like manner (e.g., left and right are presented in an opposite manner).

Since the eye tracker (e.g., the eye tracker 1520) of the head-mounted eye tracking system detects the visual direction of the eyeball in a way that faces the eyeball, the sensing signal (e.g., a corresponding graphical diagram) corresponding to the visual direction of the eyeball may be presented in a mirror manner (e.g., left and right are presented in an opposite manner).

Figure 23B:
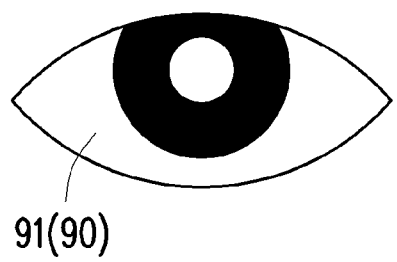
FIGS. 23B, 24B, 25B, 26B, 27B, 28B, 29B, 30B, 31B, and 32B are schematic diagrams of the visual direction of the eyeball of an example of the disclosure.

FIG. 23A is a corresponding graphical diagram representing the sensing signals obtaining from the plurality of sensing devices of the head-mounted eye tracking system of the example when the visual direction of the eyeball is centred horizontally and 10 units vertically upward (could be labelled as X+0, Y+10) as exemplary shown in FIG. 23B.

Figure 24A:
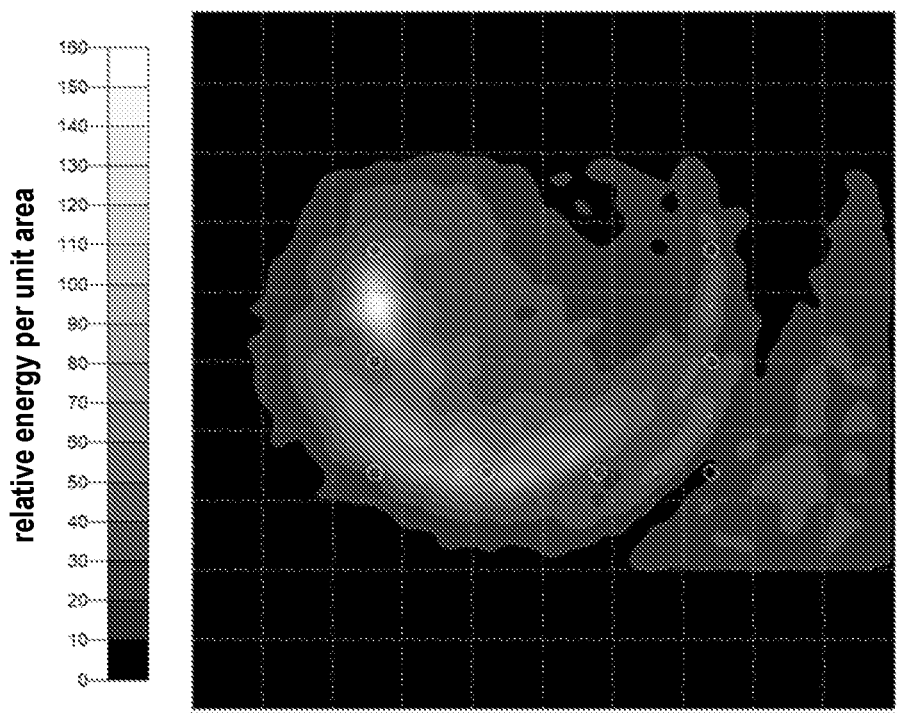
Figure 24B:
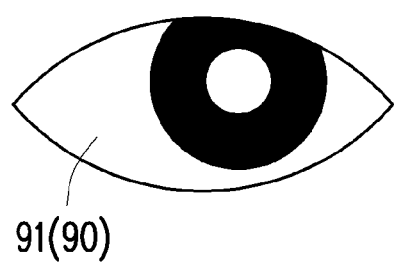

FIG. 24A is a corresponding graphical diagram representing the sensing signals obtaining from the plurality of sensing devices of the head-mounted eye tracking system of the example when the visual direction of the eyeball is 10 units horizontally to the left and 10 units vertically upward (could be labelled as X+10, Y+10) as exemplary shown in FIG. 24B.

Figure 25A:
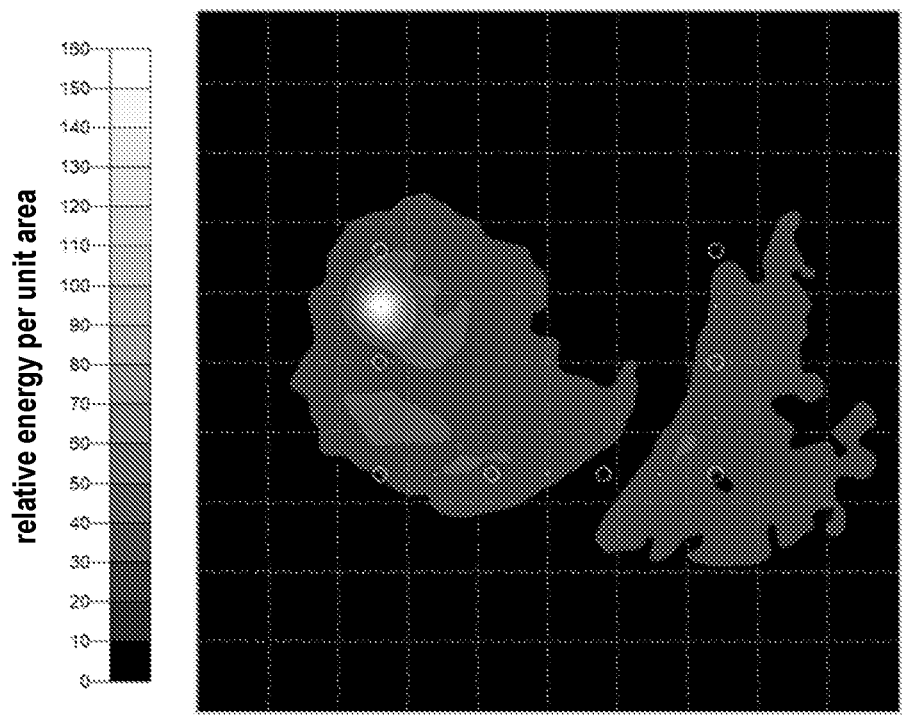
Figure 25B:
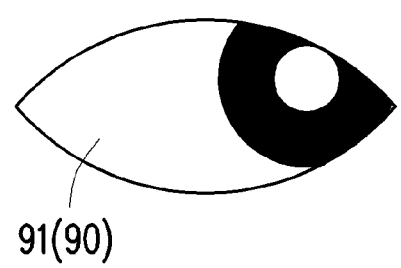

FIG. 25A is a corresponding graphical diagram representing the sensing signals obtaining from the plurality of sensing devices of the head-mounted eye tracking system of the example when the visual direction of the eyeball is 15 units horizontally to the left and 10 units vertically upward (could be labelled as X+15, Y+10) as exemplary shown in FIG. 25B.

Figure 26A:
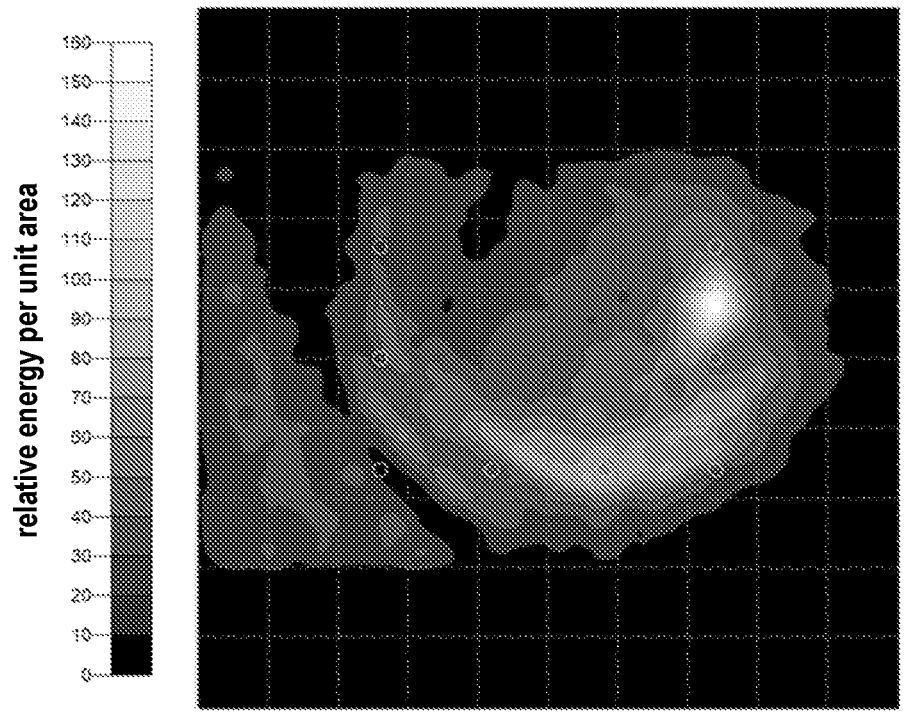
Figure 26B:
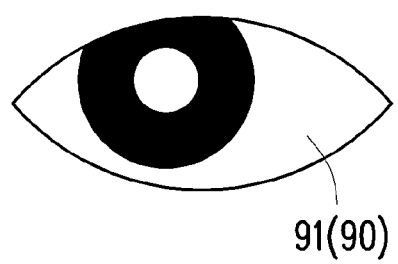

FIG. 26A is a corresponding graphical diagram representing the sensing signals obtaining from the plurality of sensing devices of the head-mounted eye tracking system of the example when the visual direction of the eyeball is 10 units horizontally to the right and 10 units vertically upward (could be labelled as X−10, Y+10) as exemplary shown in FIG. 26B.

Figure 27A:
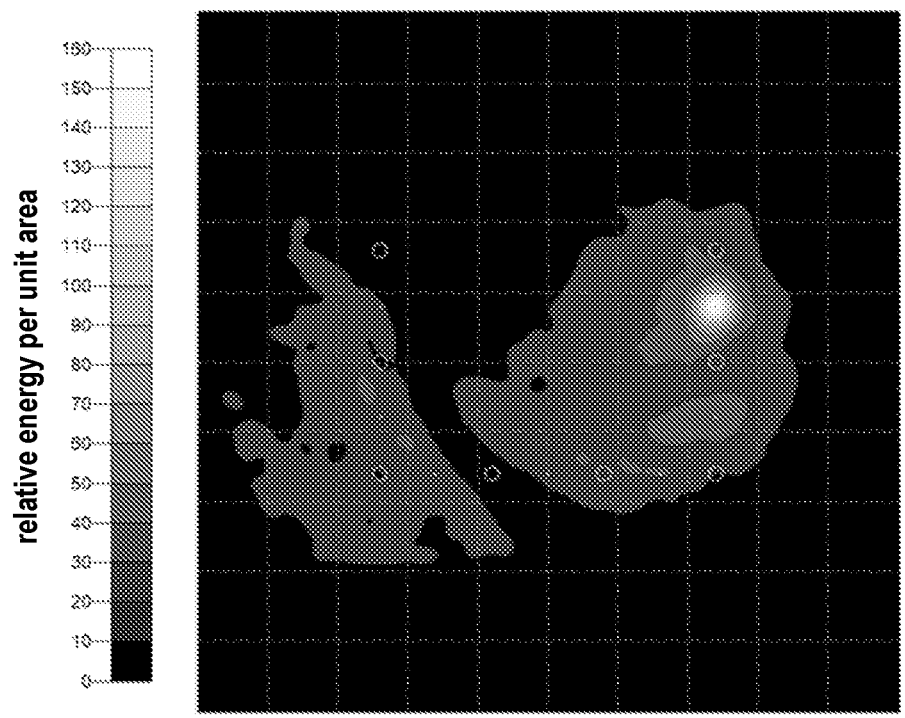
Figure 27B:
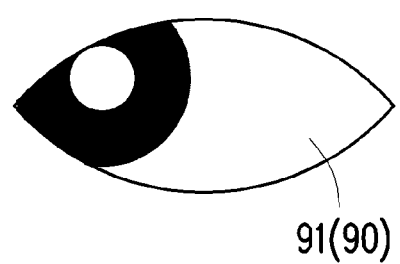

FIG. 27A is a corresponding graphical diagram representing the sensing signals obtaining from the plurality of sensing devices of the head-mounted eye tracking system of the example when the visual direction of the eyeball is 15 units horizontally to the right and 10 units vertically upward (could be labelled as X−15, Y+10) as exemplary shown in FIG. 27B.

Figure 28A:
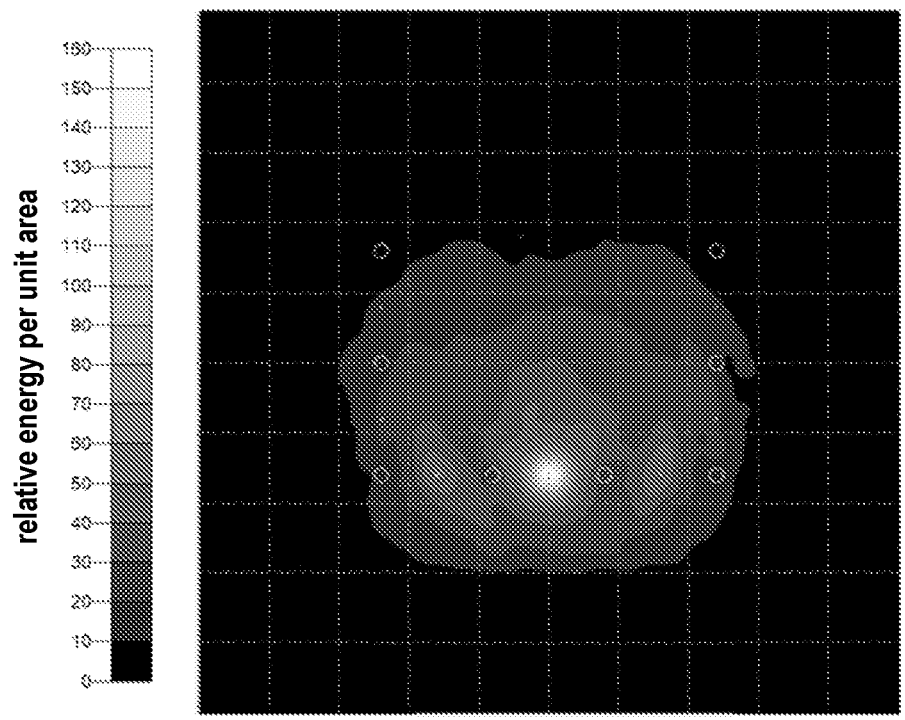
Figure 28B:
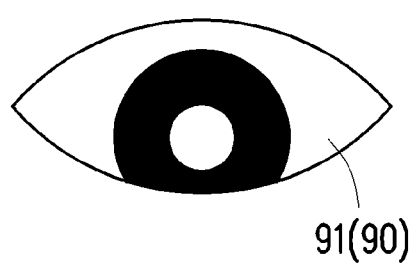

FIG. 28A is a corresponding graphical diagram representing the sensing signals obtaining from the plurality of sensing devices of the head-mounted eye tracking system of the example when the visual direction of the eyeball is centred horizontally and 10 units vertically downward (could be labelled as X+0, Y−10) as exemplary shown in FIG. 28B.

Figure 29A:
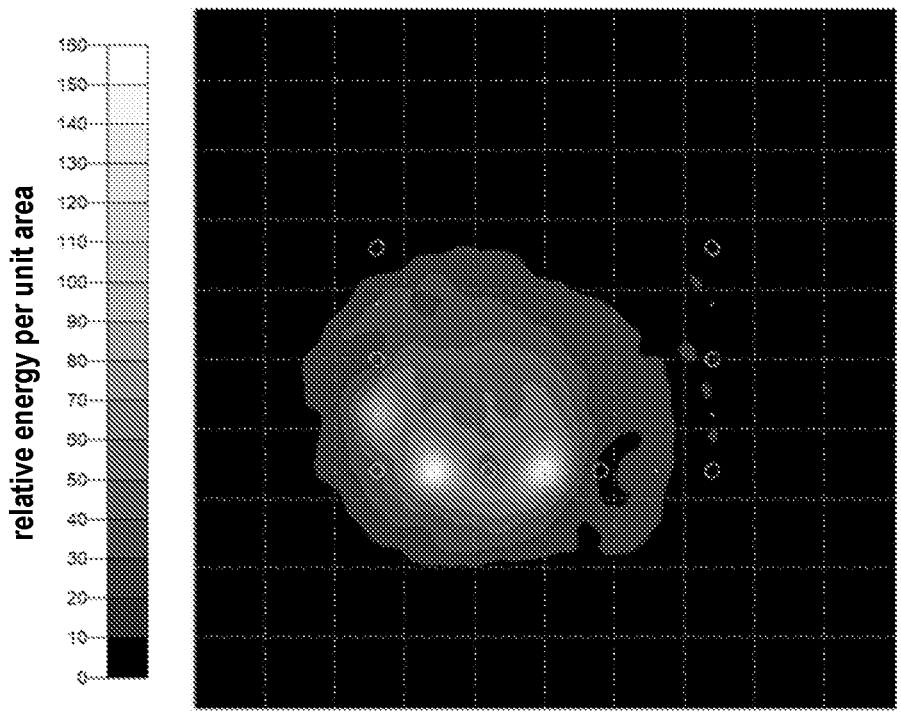
Figure 29B:
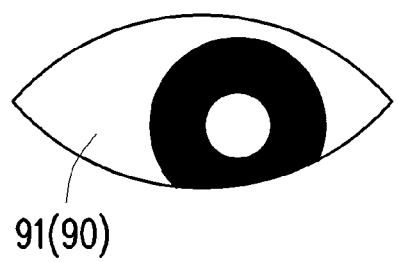

FIG. 29A is a corresponding graphical diagram representing the sensing signals obtaining from the plurality of sensing devices of the head-mounted eye tracking system of the example when the visual direction of the eyeball is 10 units horizontally to the left and 10 units vertically downward (could be labelled as X+10, Y−10) as exemplary shown in FIG. 29B.

Figure 30A:
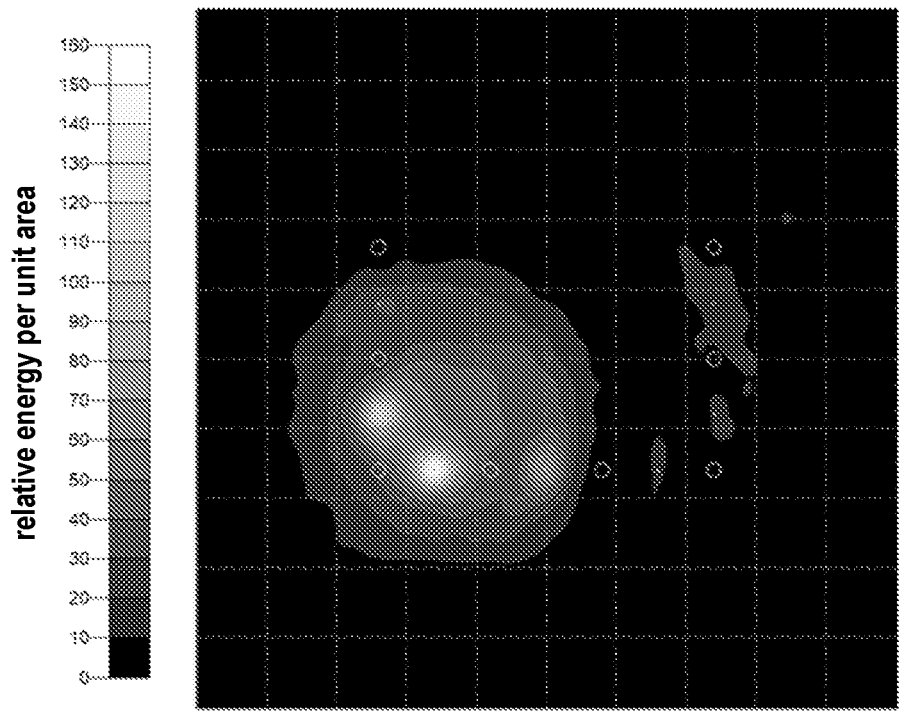
Figure 30B:
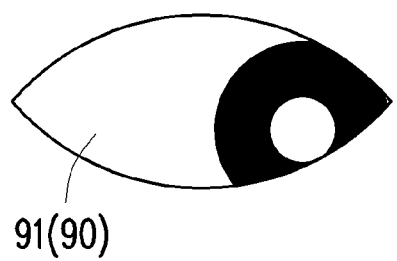

FIG. 30A is a corresponding graphical diagram representing the sensing signals obtaining from the plurality of sensing devices of the head-mounted eye tracking system of the example when the visual direction of the eyeball is 15 units horizontally to the left and 10 units vertically downward (could be labelled as X+15, Y−10) as exemplary shown in FIG. 30B.

Figure 31A:
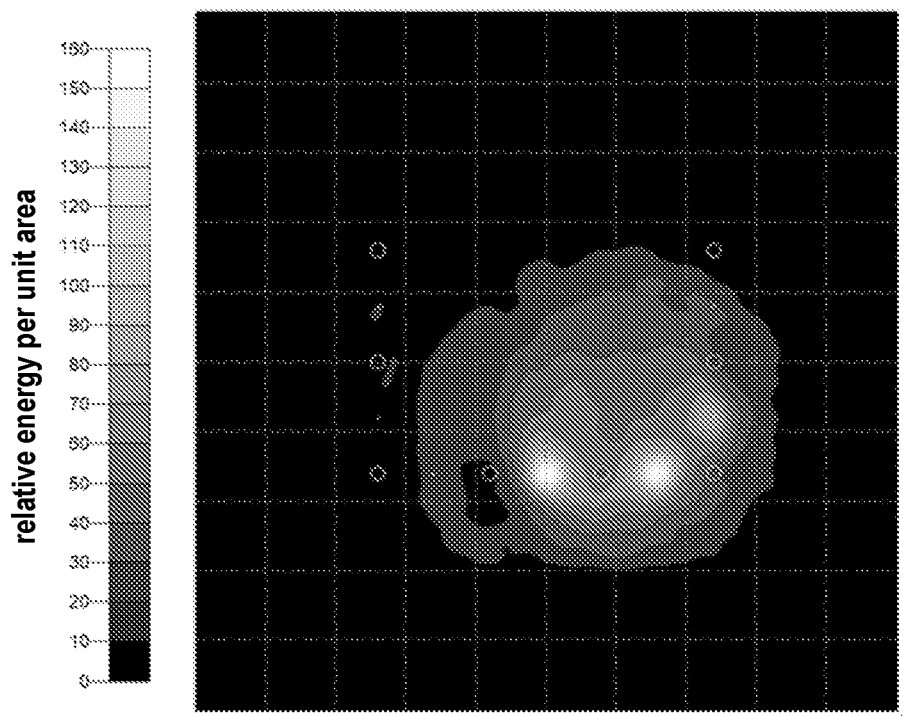
Figure 31B:
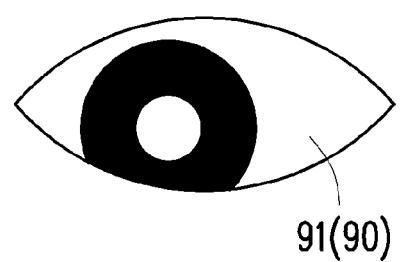

FIG. 31A is a corresponding graphical diagram representing the sensing signals obtaining from the plurality of sensing devices of the head-mounted eye tracking system of the example when the visual direction of the eyeball is 10 units horizontally to the right and 10 units vertically downward (could be labelled as X−10, Y−10) as exemplary shown in FIG. 30B.

Figure 32A:
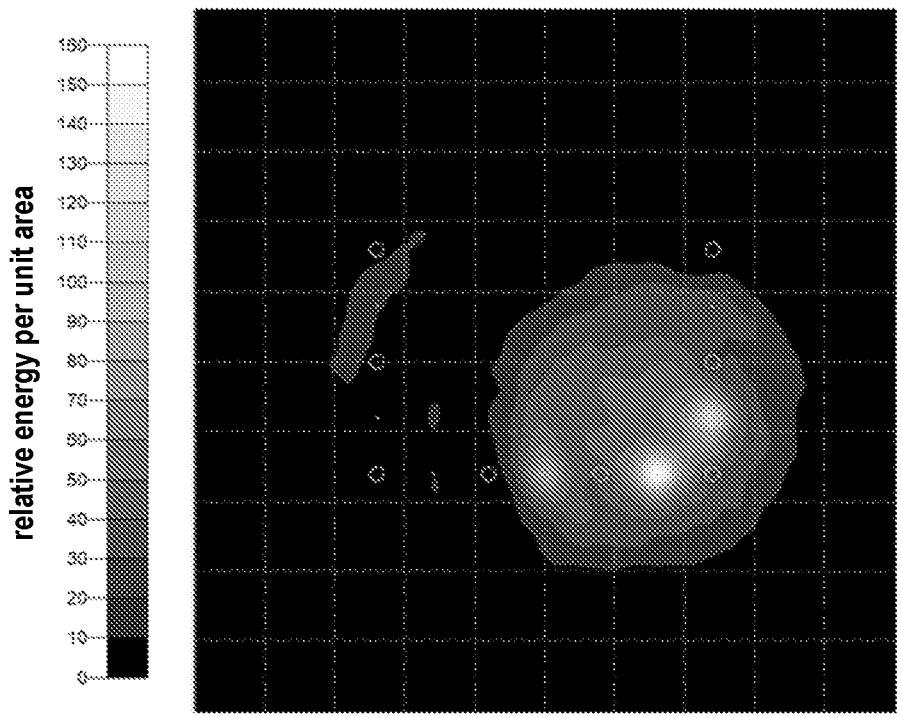
Figure 32B:
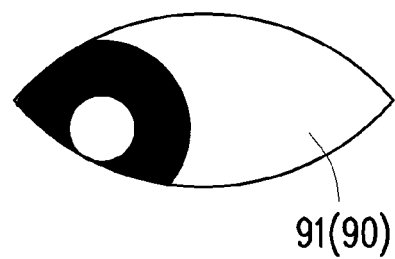

FIG. 32A is a corresponding graphical diagram representing the sensing signals obtaining from the plurality of sensing devices of the head-mounted eye tracking system of the example when the visual direction of the eyeball is 15 units horizontally to the right and 10 units vertically downward (could be labelled as X−15, Y−10) as exemplary shown in FIG. 32B.

In summary, the head-mounted eye tracking system of the disclosure is adaptable for sensing the eyeball movement of the wearer.

To sum up, in the head-mounted eye tracking system of the disclosure, the eye tracker can track the movement of the eyeball without forming an image. In this way, the sampling frequency of the sensing device may be increased correspondingly, the power consumption of the head-mounted eye tracking system during operation may be reduced, and the head-mounted eye tracking system may be integrated with other elements or devices more effectively.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A head-mounted eye tracking system, comprising:
an eye tracker adaptable for sensing eyeballs of a wearer, and the eye tracker comprising:
a plurality of light-emitting devices adaptable for emitting a tracking beam; and
a plurality of sensing devices adaptable for receiving the tracking beam reflected by the eyeballs of the wearer;
a signal processor signally connected to the eye tracker;
a plurality of light-emitting optical guides, disposed at a position corresponding to the plurality of light-emitting devices; and
an optical combiner, comprising an optical coupler, wherein the eye tracker is at least partially on the optical combiner along a front view of the head-mounted eye tracking system at a third arrangement direction perpendicular to a first arrangement direction and a second arrangement direction, the first arrangement direction is perpendicular to the second arrangement direction.

2. The head-mounted eye tracking system according to claim 1, further comprising:
a plurality of sensing optical guides, disposed corresponding to the plurality of sensing devices.

3. The head-mounted eye tracking system according to claim 1, wherein the plurality of light-emitting devices and/or the plurality of sensing devices are disposed at least corresponding to a lower portion of the eyeballs of the wearer.

4. The head-mounted eye tracking system according to claim 3, wherein the plurality of light-emitting devices and/or the plurality of sensing devices are disposed further corresponding to left and right portions of the eyeballs of the wearer.

5. The head-mounted eye tracking system according to claim 1, wherein the plurality of light-emitting devices, the plurality of sensing devices, or the plurality of light-emitting devices and the plurality of sensing devices are disposed farther away from an upper eyelid and/or upper eyelashes than a lower eyelid and/or lower eyelashes of the wearer.

6. The head-mounted eye tracking system according to claim 1, further comprising:
a display adapted to emit a display beam, wherein the display beam is irradiated to the eyeballs of the wearer through the optical combiner.

7. The head-mounted eye tracking system according to claim 6, wherein the plurality of sensing devices are arranged on the optical combiner, and the plurality of light-emitting devices are arranged on the display.

8. The head-mounted eye tracking system according to claim 1, wherein the plurality of light-emitting devices or the plurality of sensing devices are arranged on the optical combiner.

9. The head-mounted eye tracking system according to claim 1, wherein the plurality of light-emitting devices or the plurality of sensing devices at least partially overlap the optical coupler.

10. The head-mounted eye tracking system according to claim 6, further comprising a light-transmitting substrate, integrated in the optical combiner, wherein the plurality of light-emitting devices or the plurality of sensing devices surround the light-transmitting substrate.

11. The head-mounted eye tracking system according to claim 1, wherein in the first arrangement direction, part of the plurality of light-emitting devices and part of the plurality of sensing devices are arranged alternately with each other.

12. The head-mounted eye tracking system according to claim 11, wherein in the second arrangement direction, part of the plurality of light-emitting devices and part of the plurality of sensing devices are arranged alternately with each other.

13. The head-mounted eye tracking system according to claim 1, wherein the plurality of light-emitting devices or the plurality of sensing devices are disposed on a frame.

14. A head-mounted eye tracking system, comprising:
a light-transmitting substrate, made from materials that allows light to pass through;
at least two eye trackers adaptable for sensing eyeballs of a wearer on the light-transmitting substrate, each eye tracker comprising:
a light-emitting device adaptable for emitting a tracking beam; and
a sensing device adjacent to the light-emitting device and adaptable for receiving the tracking beam reflected from the eyeballs of the wearer;
a signal processor signally connected to both of the eye trackers;
a plurality of light-emitting optical guides at a position matching the plurality of light-emitting devices; and
an optical combiner, comprising an optical coupler, wherein the eye tracker is at least partially on the optical combiner along a front view of the head-mounted eye tracking system at a third arrangement direction perpendicular to a first arrangement direction and a second arrangement direction, the first arrangement direction is perpendicular to the second arrangement direction.

15. The head-mounted eye tracking system according to claim 14, wherein both of the eye trackers are arranged along an inner rim of the light-transmitting substrate.

16. The head-mounted eye tracking system according to claim 14, wherein each light-emitting device and each sensing device are alternatively arranged.

17. The head-mounted eye tracking system according to claim 14, wherein one of the light-emitting optical guides is arranged in front of one of the light-emitting devices to direct the light to another position corresponding to a boundary between the iris and the sclera of one of the eyeballs.

18. The head-mounted eye tracking system according to claim 17, wherein a sensing optical guide is arranged in front of one of the sensing devices, and the sensing optical guide of the sensing device is configured to direct the light from the another position corresponding to the boundary between the iris and the sclera of one of the eyeballs.

19. The head-mounted eye tracking system according to claim 14, wherein both of the eye trackers are integrated into the light-transmitting substrate.

* * * * *